United States Patent
Okumura

(10) Patent No.: US 12,488,423 B2
(45) Date of Patent: Dec. 2, 2025

(54) IMAGE PROCESSING DEVICE, METHOD FOR OPERATING IMAGE PROCESSING DEVICE, AND PROGRAM FOR OPERATING IMAGE PROCESSING DEVICE

(71) Applicant: FUJIFILM Corporation, Tokyo (JP)

(72) Inventor: Yukari Okumura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 377 days.

(21) Appl. No.: 18/178,064

(22) Filed: Mar. 3, 2023

(65) Prior Publication Data

US 2023/0214977 A1 Jul. 6, 2023

Related U.S. Application Data

(63) Continuation of application No. PCT/JP2021/023595, filed on Jun. 22, 2021.

(30) Foreign Application Priority Data

Sep. 29, 2020 (JP) .................................. 2020-163980

(51) Int. Cl.
  *G06T 5/50* (2006.01)
  *G06T 3/4053* (2024.01)
  *G06T 7/00* (2017.01)

(52) U.S. Cl.
  CPC .............. *G06T 5/50* (2013.01); *G06T 3/4053* (2013.01); *G06T 7/0012* (2013.01);
  (Continued)

(58) Field of Classification Search
  CPC ......... G06T 7/0012; G06T 2207/10072; G06T 2207/30068; G06T 2207/30096; G06T 2207/10076; G06T 2207/10081
  See application file for complete search history.

(56) References Cited

U.S. PATENT DOCUMENTS 10,796,464 B2 * 10/2020 Bogoni ................. G06T 11/006
2006/0061570 A1 3/2006 Cheryauka et al.
(Continued)

FOREIGN PATENT DOCUMENTS

EP 3232936 A1 10/2017
EP 3447733 A1 2/2019
(Continued)

OTHER PUBLICATIONS

An Office Action; "Notice of Reasons for Refusal," mailed by the Japanese Patent Office on Nov. 21, 2023, which corresponds to Japanese Patent Application No. 2022-553470 and is related to U.S. Appl. No. 18/178,064; with English language translation.
(Continued)

*Primary Examiner* — Utpal D Shah
*Assistant Examiner* — Jack Peter Kraynak
(74) *Attorney, Agent, or Firm* — Studebaker Brackett PLLC

(57) ABSTRACT

An image processing device includes a processor and a memory that is provided in or connected to the processor. The processor executes a region selection process of selecting a portion of a plurality of tomographic images, which indicate a plurality of tomographic planes of an object, respectively, and have a first resolution, as a target region to be set to a second resolution higher than the first resolution, a resolution enhancement process of increasing the resolution of the target region to the second resolution to generate a high-resolution partial image, and a composite two-dimensional image generation process of generating a high-resolution composite two-dimensional image having the second resolution, using the high-resolution partial image.

20 Claims, 34 Drawing Sheets

(52) U.S. Cl.
CPC ............... *G06T 2207/10072* (2013.01); *G06T 2207/20212* (2013.01); *G06T 2207/30068* (2013.01); *G06T 2207/30096* (2013.01)

(56) References Cited

U.S. PATENT DOCUMENTS

| | | | |
|---|---|---|---|
| 2009/0123052 A1 | 5/2009 | Ruth et al. | |
| 2015/0093009 A1* | 4/2015 | Woods ................. | A61B 6/03 382/131 |
| 2016/0073986 A1* | 3/2016 | Saito ................. | A61B 6/469 378/98.2 |
| 2017/0323436 A1* | 11/2017 | Foland ................. | G06T 7/0004 |
| 2020/0058098 A1 | 2/2020 | Hirakawa | |
| 2020/0211239 A1* | 7/2020 | Ng ................. | G06T 7/0012 |
| 2020/0253566 A1* | 8/2020 | Otomaru ................. | G06T 7/13 |
| 2021/0398259 A1* | 12/2021 | Yamazoe ............... | G06N 3/084 |
| 2022/0015731 A1* | 1/2022 | Liu ................. | A61B 6/502 |
| 2022/0166942 A1* | 5/2022 | Harada ................. | H04N 23/30 |

FOREIGN PATENT DOCUMENTS

| | | |
|---|---|---|
| JP | 2006-087921 A | 4/2006 |
| JP | 2009-276163 A | 11/2009 |
| JP | 2010-011964 A | 1/2010 |
| JP | 2014-128716 A | 7/2014 |
| JP | 2015-006324 A | 1/2015 |
| JP | 2020-025786 A | 2/2020 |
| WO | 2010/059920 A2 | 5/2010 |
| WO | 2016/099924 A1 | 6/2016 |

OTHER PUBLICATIONS

Glasner, Daniel et al.; "Super-Resolution from a Single Image"; ICCV; Sep. 29, 2009-Oct. 2, 2009, Total 8 Pages.
International Search Report issued in PCT/JP2021/023595; mailed Aug. 3, 2021.
International Preliminary Report on Patentability (Chapter I) and Written Opinion of the International Searching Authority issued in PCT/JP2021/023595; issued Mar. 28, 2023.
The extended European search report issued by the European Patent Office on Mar. 26, 2024, which corresponds to European Patent Application No. 21874835.8-1210 and is related to U.S. Appl. No. 18/178,064.

* cited by examiner

FIG. 31

| | | | | | 56AM | | | | | | | | HRP | |
|---|---|---|---|---|---|---|---|---|---|---|---|---|---|---|
| 0.05 | 0.05 | 0.06 | 0.06 | 0.08 | 0.08 | 0.10 | 0.10 | 0.08 | 0.08 | 0.06 | 0.06 | 0.05 | 0.05 |
| 0.05 | 0.05 | 0.06 | 0.06 | 0.08 | 0.08 | 0.10 | 0.10 | 0.08 | 0.08 | 0.06 | 0.06 | 0.05 | 0.05 |
| 0.06 | 0.06 | 0.20 | 0.20 | 0.25 | 0.25 | 0.30 | 0.30 | 0.25 | 0.25 | 0.20 | 0.20 | 0.06 | 0.06 |
| 0.06 | 0.06 | 0.20 | 0.20 | 0.25 | 0.25 | 0.30 | 0.30 | 0.25 | 0.25 | 0.20 | 0.20 | 0.06 | 0.06 |
| 0.08 | 0.08 | 0.25 | 0.25 | 0.50 | 0.50 | 0.70 | 0.70 | 0.50 | 0.50 | 0.25 | 0.25 | 0.08 | 0.08 |
| 0.08 | 0.08 | 0.25 | 0.25 | 0.50 | 0.50 | 0.70 | 0.70 | 0.50 | 0.50 | 0.25 | 0.25 | 0.08 | 0.08 |
| 0.10 | 0.10 | 0.30 | 0.30 | 0.70 | 0.70 | 1.00 | 1.00 | 0.70 | 0.70 | 0.30 | 0.30 | 0.10 | 0.10 |
| 0.10 | 0.10 | 0.30 | 0.30 | 0.70 | 0.70 | 1.00 | 1.00 | 0.70 | 0.70 | 0.30 | 0.30 | 0.10 | 0.10 |
| 0.08 | 0.08 | 0.25 | 0.25 | 0.50 | 0.50 | 0.70 | 0.70 | 0.50 | 0.50 | 0.25 | 0.25 | 0.08 | 0.08 |
| 0.08 | 0.08 | 0.25 | 0.25 | 0.50 | 0.50 | 0.70 | 0.70 | 0.50 | 0.50 | 0.25 | 0.25 | 0.08 | 0.08 |
| 0.06 | 0.06 | 0.20 | 0.20 | 0.25 | 0.25 | 0.30 | 0.30 | 0.25 | 0.25 | 0.20 | 0.20 | 0.06 | 0.06 |
| 0.06 | 0.06 | 0.20 | 0.20 | 0.25 | 0.25 | 0.30 | 0.30 | 0.25 | 0.25 | 0.20 | 0.20 | 0.06 | 0.06 |
| 0.05 | 0.05 | 0.06 | 0.06 | 0.08 | 0.08 | 0.10 | 0.10 | 0.08 | 0.08 | 0.06 | 0.06 | 0.05 | 0.05 |
| 0.05 | 0.05 | 0.06 | 0.06 | 0.08 | 0.08 | 0.10 | 0.10 | 0.08 | 0.08 | 0.06 | 0.06 | 0.05 | 0.05 |

IMAGE PROCESSING DEVICE, METHOD FOR OPERATING IMAGE PROCESSING DEVICE, AND PROGRAM FOR OPERATING IMAGE PROCESSING DEVICE

CROSS-REFERENCE TO RELATED APPLICATION

This application is a continuation application of International Application No. PCT/JP2021/023595, filed Jun. 22, 2021, the disclosure of which is incorporated herein by reference in its entirety. Further, this application claims priority from Japanese Patent Application No. 2020-163980 filed on Sep. 29, 2020, the disclosure of which is incorporated herein by reference in its entirety.

BACKGROUND

1. Technical Field

The technology of the present disclosure relates to an image processing device, a method for operating an image processing device, and a program for operating an image processing device.

2. Description of the Related Art

A technique for obtaining a plurality of tomographic images in any tomographic planes of an object, such as tomosynthesis imaging which irradiates the object with radiation at a plurality of different irradiation angles, is known. According to the tomographic images, a structure of the object which extends in a depth direction in which the tomographic planes are arranged can be separately drawn in each tomographic image. Therefore, it is possible to draw a structure of interest, such as a lesion, which is difficult to draw in a simple two-dimensional image. The simple two-dimensional image is a projection image obtained by irradiating an object with radiation at one irradiation angle at which a radiation source faces a radiation detector.

In addition, a technique is known in which a mammography apparatus that images a breast as an object combines a plurality of tomographic images acquired by tomosynthesis imaging in a depth direction of the breast, using an addition method, an averaging method, a maximum intensity projection method, a minimum intensity projection method, or the like, to generate a composite two-dimensional image which is a pseudo two-dimensional image corresponding to a simple two-dimensional image (see JP2014-128716A).

Meanwhile, increasing the resolution of an image is being performed in various fields. For example, <Daniel Glasner, et al. "Super-Resolution from a Single Image", ICCV, 29 Sep.-2 Oct. 2009> proposes a super-resolution method which increases resolution using one target image as a method for increasing the resolution of an image.

SUMMARY

A technique that increases the resolution of the composite two-dimensional image to express the morphology of details of the structure of interest, such as a tumor, a spicula, or a calcification, in the breast in high definition has been studied. However, the method for increasing the resolution of the composite two-dimensional image has the following problems. That is, in a case in which the structure of interest extends in the depth direction of the object, the morphologies of the details of the structures of interest separately drawn in different tomographic images are overlapped by the composition in the composite two-dimensional image. Therefore, the morphological information of the details drawn in each tomographic image is partially lost in the composite two-dimensional image. Even in a case in which the resolution of the composite two-dimensional image is increased, there is a case in which it is not possible to express the morphology of the details of the structure of interest included in the tomographic image in high definition.

Therefore, a technique is considered which increases the resolution of the tomographic image instead of the composite two-dimensional image and generates a high-resolution composite two-dimensional image using the tomographic image whose resolution has been increased. The increase in the resolution of the tomographic image makes it possible to express the morphology of the details of the structure of interest drawn in the tomographic image in high definition.

However, in a case in which the resolution of all of a plurality of tomographic images obtained by each imaging operation is increased, a load on data processing, such as a processing time required for increasing the resolution, increases. In addition, in a case in which the resolution of all of the plurality of tomographic images is increased, the amount of data is increased. Therefore, a load on data processing, such as an increase in the capacity of a memory in the data processing and an increase in transmission time, is also increased.

An embodiment according to the technology of the present disclosure provides an image processing device, a method for operating an image processing device, and a program for operating an image processing device that can obtain a high-definition composite two-dimensional image while suppressing a load on data processing, as compared to a case in which the resolution of all of a plurality of tomographic images is increased.

An image processing device according to the technology of the present disclosure comprises: a processor; and a memory that is provided in or connected to the processor. The processor performs a region selection process of selecting a portion of a plurality of tomographic images, which indicate a plurality of tomographic planes of an object, respectively, and have a first resolution, as a target region to be set to a second resolution higher than the first resolution, a resolution enhancement process of increasing the resolution of the target region to the second resolution to generate a high-resolution partial image, and a composite two-dimensional image generation process of generating a high-resolution composite two-dimensional image having the second resolution, using the high-resolution partial image.

Preferably, in the region selection process, the processor selects a region including a structure of interest in the tomographic image as the target region.

Preferably, the object is a breast, and the structure of interest includes at least one of a tumor, a calcification, a spicula, or a linear structure.

Preferably, in a case in which one pixel in the tomographic image is set as a pixel of interest and a region with a preset size which has the pixel of interest as its center is set as a region of interest, in the region selection process, the processor derives a representative value indicating a feature amount of the region of interest in each of a plurality of the tomographic images, compares the representative values for each of the regions of interest at a corresponding coordinate position between the tomographic images, selects one or more of the tomographic images on the basis of a comparison result of the representative values, and selects the target region having the pixel of interest as its center in the selected tomographic image.

Preferably, in the region selection process, the processor selects a predetermined number of the tomographic images on the basis of a ranking of the representative values and selects the target region in each of the selected tomographic images.

Preferably, in the region selection process, the processor sets the region of interest in at least a region in which the object is present in the tomographic image.

Preferably, in the region selection process, the processor sets the region of interest for each of the pixels.

Preferably, in the region selection process, the processor sets the regions of interest having a size of m×m pixels, with an interval of n or more pixels between the pixels of interest, among the pixels included in the tomographic image, where n is a natural number equal to or greater than 1, m is a natural number equal to or greater 3, and m>n is satisfied.

Preferably, the processor combines a plurality of tomographic images having the first resolution in a depth direction, in which the tomographic planes are arranged, to generate a low-resolution composite two-dimensional image having the first resolution. Preferably, in the composite two-dimensional image generation process, the processor combines an enlarged image obtained by increasing the number of pixels of the low-resolution composite two-dimensional image to the number of pixels corresponding to the second resolution with the high-resolution partial image to generate the high-resolution composite two-dimensional image.

Preferably, in the composite two-dimensional image generation process, the processor increases the resolution of the low-resolution composite two-dimensional image to the second resolution to generate a temporary high-resolution composite two-dimensional image as the enlarged image and combines the temporary high-resolution composite two-dimensional image with the high-resolution partial image to generate the high-resolution composite two-dimensional image.

Preferably, in the region selection process, in a case in which a region including a structure of interest in the tomographic image is selected as the target region, the processor detects the structure of interest using any one of the tomographic image, the low-resolution composite two-dimensional image, or the temporary high-resolution composite two-dimensional image.

Preferably, the processor detects the structure of interest using the low-resolution composite two-dimensional image.

Preferably, in a case in which a pixel value of the enlarged image is set as a temporary pixel value, the processor combines pixels of the enlarged image and the high-resolution partial image, using any one of a method that substitutes the temporary pixel value with a pixel value of the high-resolution partial image, a method that calculates an average value of the temporary pixel value and the pixel value of the high-resolution partial image and substitutes the average value with the temporary pixel value, or a method that adds the pixel value of the high-resolution partial image to the temporary pixel value.

Preferably, the processor generates the high-resolution partial image for each target region in the resolution enhancement process and generates the high-resolution composite two-dimensional image using only a plurality of the high-resolution partial images in the composite two-dimensional image generation process.

Preferably, in the composite two-dimensional image generation process, the processor combines a plurality of pixels at a corresponding coordinate position in the tomographic planes to derive a pixel value of the high-resolution composite two-dimensional image, for an overlap portion in which the plurality of high-resolution partial images having different depths of the tomographic planes overlap each other in a depth direction of the tomographic planes, and sets the pixel value of any one of the plurality of high-resolution partial images as the pixel value of the high-resolution composite two-dimensional image for a portion other than the overlap portion.

Preferably, the processor combines the plurality of corresponding pixels in the overlap portion using any one of simple addition, addition and averaging, or weighted addition and averaging for pixel values.

Preferably, in a case in which the high-resolution partial image is generated for the target region selected on the basis of the region of interest, in the composite two-dimensional image generation process, the processor sets at least one of a first weight, which decreases from a center pixel corresponding to the pixel of interest in the region of interest toward peripheral pixels, or a second weight, which corresponds to a representative value indicating a feature amount of each region of interest, for each pixel in the high-resolution partial image and performs the weighted addition and averaging on the basis of at least one of the first weight or the second weight.

Preferably, in the resolution enhancement process, the processor applies a super-resolution method using the tomographic image to generate the high-resolution partial image.

Preferably, in the resolution enhancement process, the processor applies a method, which uses a plurality of projection images used to reconstruct the plurality of tomographic images, to generate the high-resolution partial image.

According to the technology of the present disclosure, there is provided a method for operating an image processing device. The method comprises: a region selection process of selecting a portion of a plurality of tomographic images, which indicate a plurality of tomographic planes of an object, respectively, and have a first resolution, as a target region to be set to a second resolution higher than the first resolution; a resolution enhancement process of increasing the resolution of the target region to the second resolution to generate a high-resolution partial image; and a composite two-dimensional image generation process of generating a high-resolution composite two-dimensional image having the second resolution, using the high-resolution partial image.

According to the technology of the present disclosure, there is provided a program for operating an image processing device. The program causes a computer to execute: a region selection process of selecting a portion of a plurality of tomographic images, which indicate a plurality of tomographic planes of an object, respectively, and have a first resolution, as a target region to be set to a second resolution higher than the first resolution; a resolution enhancement process of increasing the resolution of the target region to the second resolution to generate a high-resolution partial image; and a composite two-dimensional image generation process of generating a high-resolution composite two-dimensional image having the second resolution, using the high-resolution partial image.

According to the technology of the present disclosure, it is possible to obtain a high-definition composite two-dimensional image while suppressing a load on data processing as compared to a case in which the resolution of all of a plurality of tomographic images is increased.

BRIEF DESCRIPTION OF THE DRAWINGS

Exemplary embodiments according to the technique of the present disclosure will be described in detail based on the following figures, wherein:

FIG. 31 is a diagram illustrating a first weight.

DETAILED DESCRIPTION

First Embodiment

Figure 1:
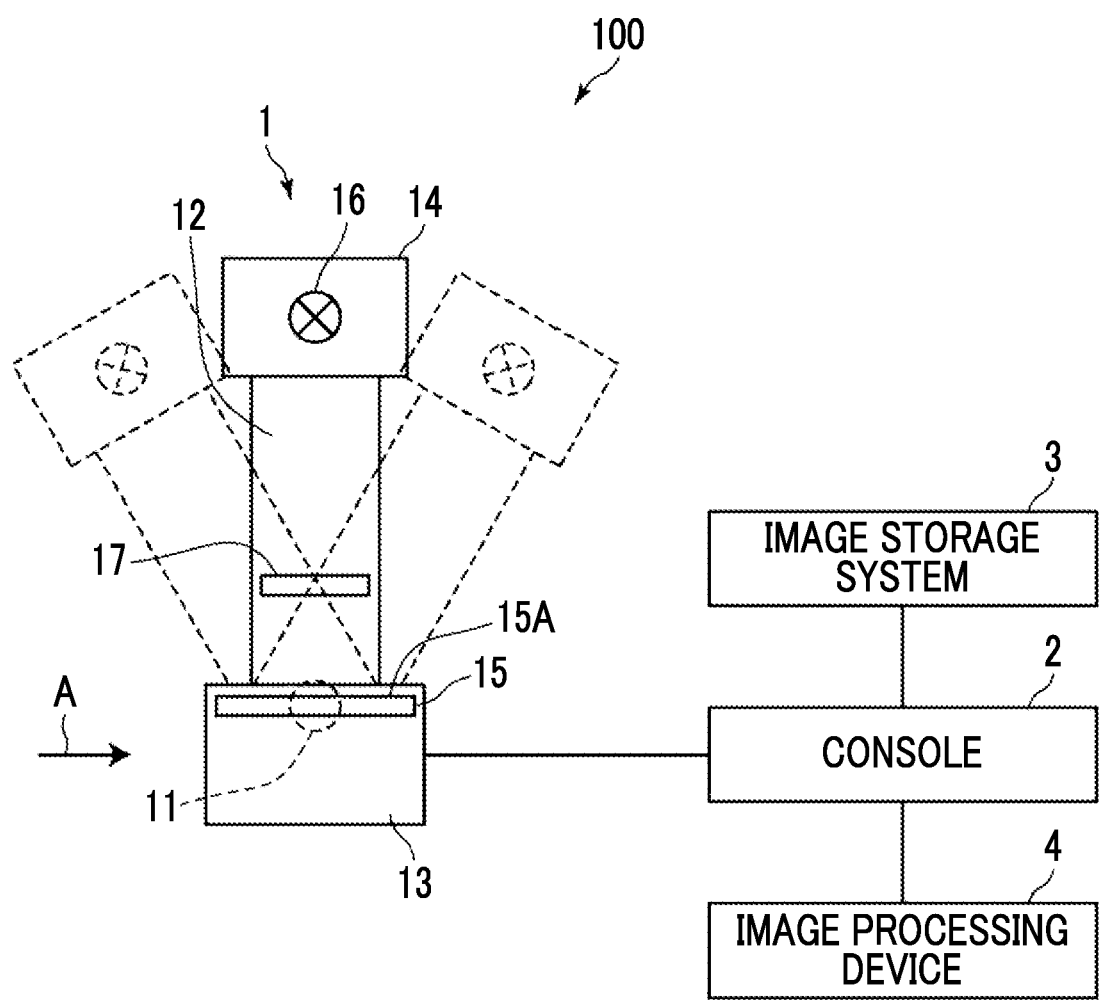
FIG. 1 is a diagram illustrating a schematic configuration of a radiography system including an image processing device.
Figure 2:
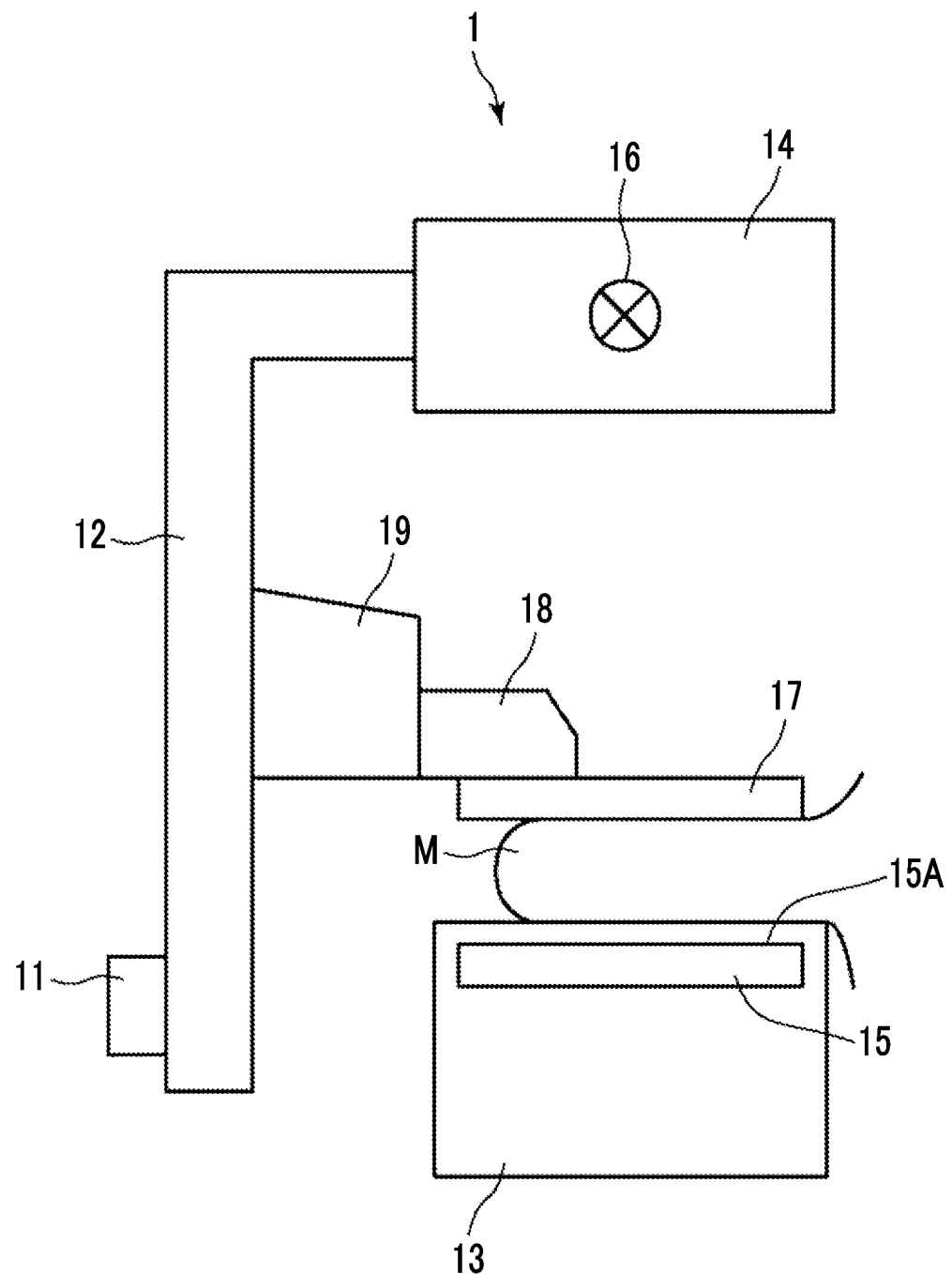
FIG. 2 is a side view illustrating a mammography apparatus as viewed from a direction of an arrow A in FIG. 1.

Hereinafter, embodiments of the present disclosure will be described with reference to the drawings. FIG. 1 is a diagram schematically illustrating a configuration of a radiography system 100 to which an image processing device 4 according to an embodiment of the present disclosure is applied, and FIG. 2 is a diagram illustrating a mammography apparatus 1 in the radiography system 100 as viewed from a direction of an arrow A in FIG. 1. As illustrated in FIG. 1, the radiography system 100 according to this embodiment images a breast M, which is an example of an "object" according to the technology of the present disclosure, at a plurality of different irradiation angles to acquire a plurality of radiographic images, that is, a plurality of projection images, in order to perform tomosynthesis imaging on the breast M to generate tomographic images of the breast M. The radiography system 100 according to this embodiment comprises the mammography apparatus 1, a console 2, an image storage system 3, and the image processing device 4.

The mammography apparatus 1 comprises an arm portion 12 that is connected to a base (not illustrated) by a rotation shaft 11. An imaging table 13 is attached to one end of the arm portion 12, and a radiation emitting unit 14 is attached to the other end of the arm portion 12 to face the imaging table 13. The arm portion 12 is configured such that only an end portion to which the radiation emitting unit 14 is attached can be rotated with the imaging table 13 fixed.

A radiation detector 15, such as a flat panel detector, is provided in the imaging table 13. The radiation detector 15 has a radiation detection surface 15A. In addition, for example, a circuit substrate, which is provided with a charge amplifier that converts a charge signal read from the radiation detector 15 into a voltage signal, a correlated double sampling circuit that samples the voltage signal output from the charge amplifier, an analog-digital (AD) conversion unit that converts the voltage signal into a digital signal, and the like, is provided in the imaging table 13.

A radiation source 16 is accommodated in the radiation emitting unit 14. The radiation source 16 emits radiation such as γ-rays or X-rays. The time when the radiation source 16 emits the radiation and radiation generation conditions in the radiation source 16, that is, the selection of materials of a target and a filter, a tube voltage, an irradiation time, and the like are controlled by the console 2.

Further, the arm portion 12 is provided with a compression plate 17 that is disposed above the imaging table 13 and presses and compresses the breast M, a support portion 18 that supports the compression plate 17, and a movement mechanism 19 that moves the support portion 18 in an up-down direction in FIGS. 1 and 2. In addition, an interval between the compression plate 17 and the imaging table 13, that is, a compression thickness is input to the console 2.

The console 2 has a function of controlling the mammography apparatus 1 using an imaging order and various types of information acquired from a radiology information system (RIS) (not illustrated) or the like through a wireless communication local area network (LAN) or the like and instructions or the like directly given by a technician or the like. Specifically, the console 2 directs the mammography apparatus 1 to perform the tomosynthesis imaging on the breast M, acquires a plurality of projection images as described below, and reconstructs the plurality of projection images to generate a plurality of tomographic images. For example, in this embodiment, a server computer is used as the console 2.

The image storage system 3 is a system that stores image data such as radiographic images, projection images, and tomographic images captured by the mammography apparatus 1. The image storage system 3 extracts an image corresponding to a request from, for example, the console 2 and the image processing device 4 from the stored images and transmits the image to a device that is the source of the request. A specific example of the image storage system 3 is a picture archiving and communication system (PACS).

Figure 3:
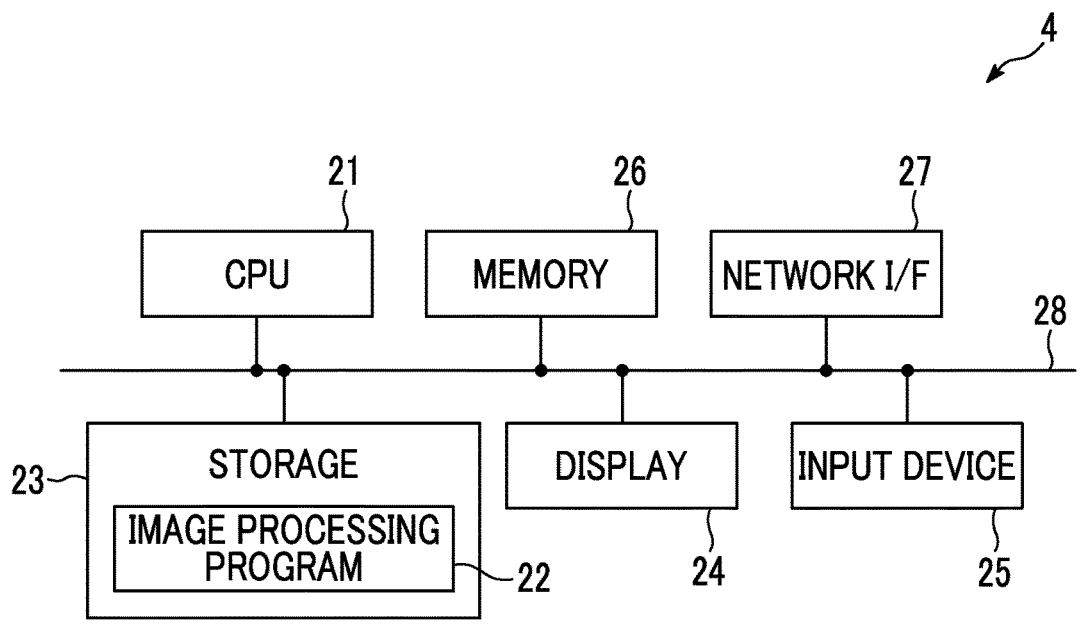
FIG. 3 is a diagram illustrating a hardware configuration of the image processing device.

Next, an image processing device 4 according to a first embodiment will be described. First, a hardware configuration of the image processing device 4 according to the first embodiment will be described with reference to FIG. 3. As illustrated in FIG. 3, the image processing device 4 is a computer, such as a workstation, a server computer, or a personal computer, and comprises a central processing unit (CPU) 21, a non-volatile storage 23, and a memory 26 as a temporary storage area. In addition, the image processing device 4 comprises a display 24, such as a liquid crystal display, an input device 25, such as a keyboard and a mouse, and a network interface (I/F) 27 that is connected to a network (not illustrated). The CPU 21, the storage 23, the display 24, the input device 25, the memory 26, and the network I/F 27 are connected to a bus 28. Further, the CPU 21 is an example of a "processor" according to the technology of the present disclosure. In addition, the memory 26 is an example of a "memory" according to the technology of the present disclosure. Furthermore, the memory 26 may be provided in the CPU 21.

The storage 23 is implemented by a hard disk drive (HDD), a solid state drive (SSD), a flash memory, or the like. An image processing program 22 installed in the image processing device 4 is stored in the storage 23 as a storage medium. The CPU 21 reads the image processing program 22 from the storage 23, expands the image processing program 22 in the memory 26, and executes the expanded image processing program 22. The image processing program 22 is an example of a "program for operating an image processing device" according to the technology of the present disclosure.

In addition, the image processing program 22 is stored in a storage device of a server computer connected to the network or a network storage in a state in which it can be accessed from the outside and is downloaded and installed in the computer constituting the image processing device 4 as required. Alternatively, the image processing program 22 is recorded on a recording medium, such as a digital versatile disc (DVD) or a compact disc read only memory (CD-ROM), is distributed, and is installed in the computer constituting the image processing device 4 from the recording medium.

Figure 4:
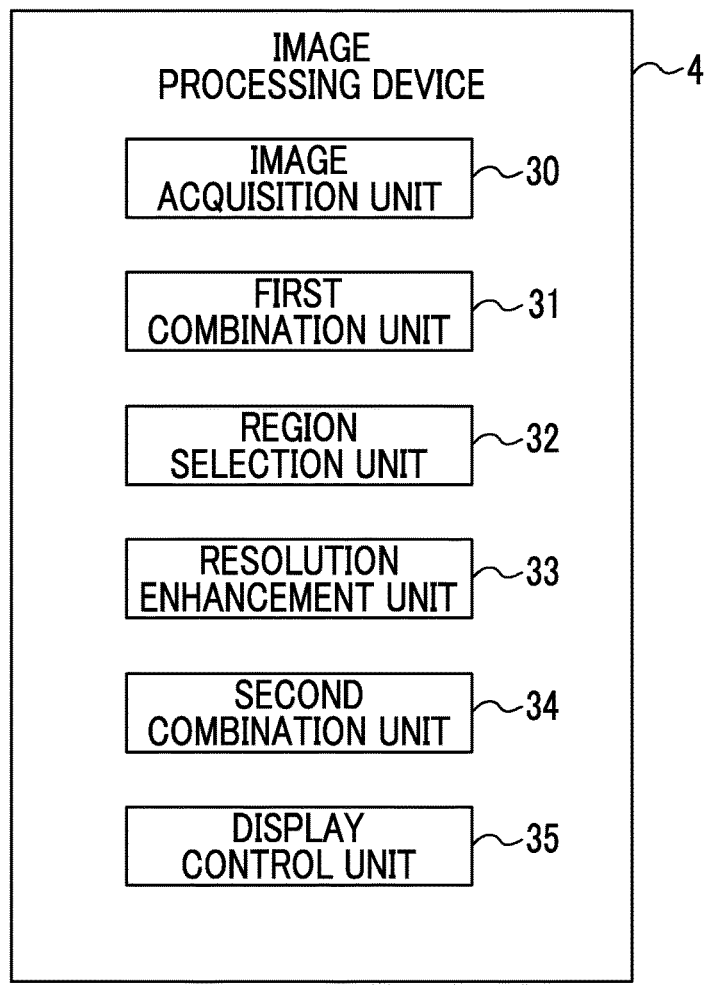
FIG. 4 is a block diagram illustrating a functional configuration of the image processing device.

Next, a functional configuration of the image processing device 4 according to the first embodiment will be described. FIG. 4 is a diagram illustrating the functional configuration of the image processing device 4 according to the first embodiment. As illustrated in FIG. 4, the image processing device 4 comprises an image acquisition unit 30, a first combination unit 31, a region selection unit 32, a resolution enhancement unit 33, a second combination unit 34, and a display control unit 35. The CPU 21 executes the image processing program 22 such that the image processing device 4 functions as the image acquisition unit 30, the first combination unit 31, the region selection unit 32, the resolution enhancement unit 33, the second combination unit 34, and the display control unit 35.

The image acquisition unit 30 acquires the tomographic image from the console 2 or the image storage system 3 through the network I/F 27. In addition, the image acquisition unit 30 may acquire the projection image from the console 2 or the image storage system 3 through the network I/F 27.

Here, tomosynthesis imaging for generating tomographic images will be described with reference to FIG. 5. The console 2 controls the mammography apparatus 1 such that the mammography apparatus 1 performs the tomosynthesis imaging. In the tomosynthesis imaging, the mammography apparatus 1 rotates the arm portion 12 (see FIG. 1) about the rotation shaft 11 to move the radiation source 16 to each of radiation source positions S1, S2, Sn. The angle at which the breast M is irradiated with the radiation is changed by this movement of the radiation source 16 to each radiation source position. Further, the breast M, which is the object, is irradiated with the radiation under predetermined imaging conditions for tomosynthesis imaging at a plurality of radiation source positions on a movement trajectory of the radiation source 16. The radiation transmitted through the breast M is detected by the radiation detector 15, and the radiation detector 15 outputs projection images Gi (i=1 to n, n is the number of radiation source positions and is, for example, 15) based on the detected radiation to the console 2. Then, the console 2 acquires a plurality of projection images G1, G2, . . . , Gn corresponding to the plurality of radiation source positions S1 to Sn, respectively. In addition, for example, the same dose of radiation is emitted to the breast M at each of the radiation source positions S1 to Sn.

Figure 5:
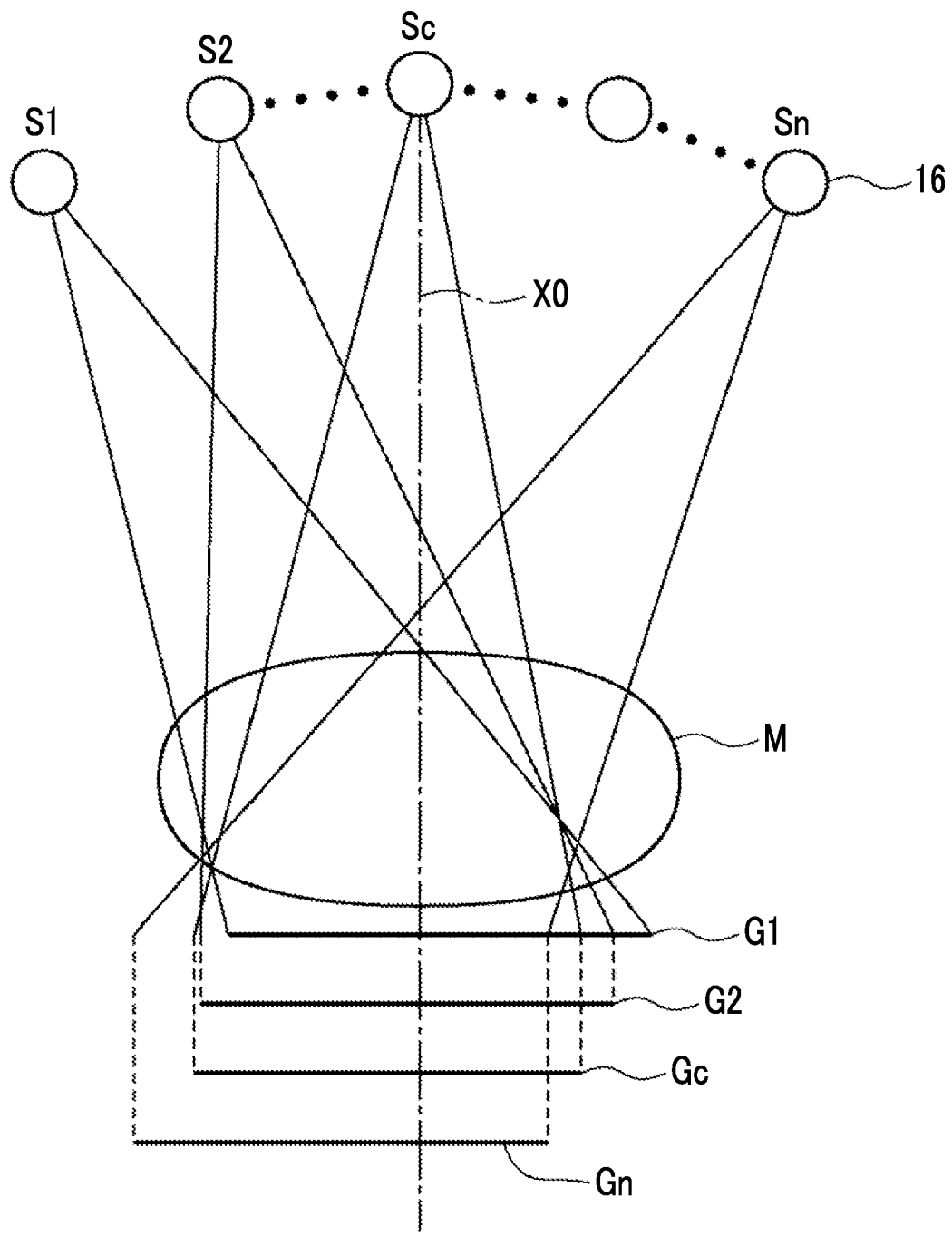
FIG. 5 is a diagram illustrating a method for acquiring projection images.

Further, in FIG. 5, a radiation source position Sc is a radiation source position where an optical axis XO of the radiation emitted from the radiation source 16 is orthogonal to the detection surface 15A of the radiation detector 15. That is, the radiation source position Sc is a position for simple imaging in which the radiation source 16 faces the radiation detector 15 and emits radiation.

Figure 6:
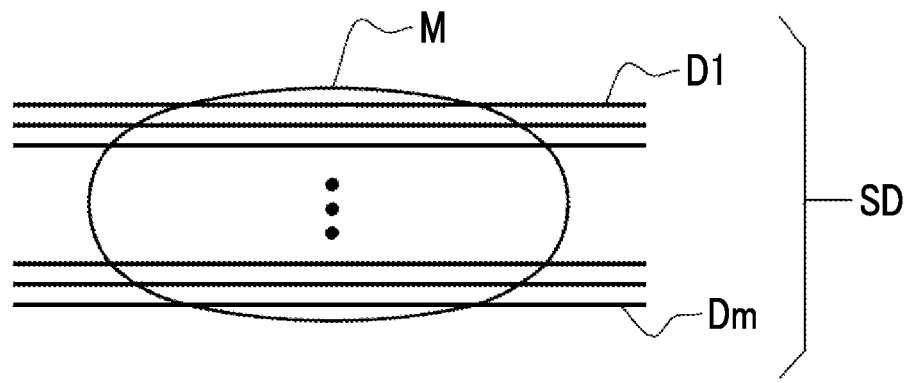
FIG. 6 is a diagram illustrating a method for generating tomographic images.

The console 2 reconstructs the plurality of projection images Gi acquired by the tomosynthesis imaging to generate tomographic images in which the desired tomographic planes of the breast M have been highlighted. Specifically, the console 2 reconstructs a plurality of tomographic images Dj (j=1 to m, m is the number of tomographic images and is, for example 50) in each of a plurality of tomographic planes of the breast M as illustrated in FIG. 6 from the plurality of projection images Gi, using a known back projection method, such as a simple back projection method or a filtered back projection method. In the case of the reconstruction, pixels having three-dimensional coordinate positions in a three-dimensional space including the breast M are set, and the pixel values of the corresponding pixels in the plurality of projection images Gi are back-projected to calculate the pixel values of the set three-dimensional pixels. The plurality of tomographic images Dj constitute a tomographic image group SD which is three-dimensional volume data in the set three-dimensional space. In addition, for example, the pixel value of the tomographic image Dj is larger as brightness is higher (that is, closer to white) and is smaller as the brightness is lower (that is, closer to black).

In the tomographic image group SD, the plurality of tomographic images Dj are arranged along a depth direction of the tomographic planes in the breast M. In the plurality of tomographic images Dj, the coordinate positions of each pixel in each tomographic plane correspond to each other. Here, in the plurality of tomographic images Dj, pixels at the same coordinate position in the tomographic planes are referred to as corresponding pixels. In addition, the tomographic images Dj have a first resolution. The first resolution is determined according to the resolution of the projection images Gi output by the radiation detector 15 and the number of coordinate positions in the tomographic planes in the three-dimensional space set in a case in which the tomographic image group SD is reconstructed from the projection images Gi by the back projection method or the like.

The console 2 directly transmits the generated tomographic image group SD to the image processing device 4 or transmits the generated tomographic image group SD to the image storage system 3. The image acquisition unit 30 of the image processing device 4 performs an acquisition process of acquiring the tomographic image group SD directly or indirectly transmitted from the console 2.

Figure 7:
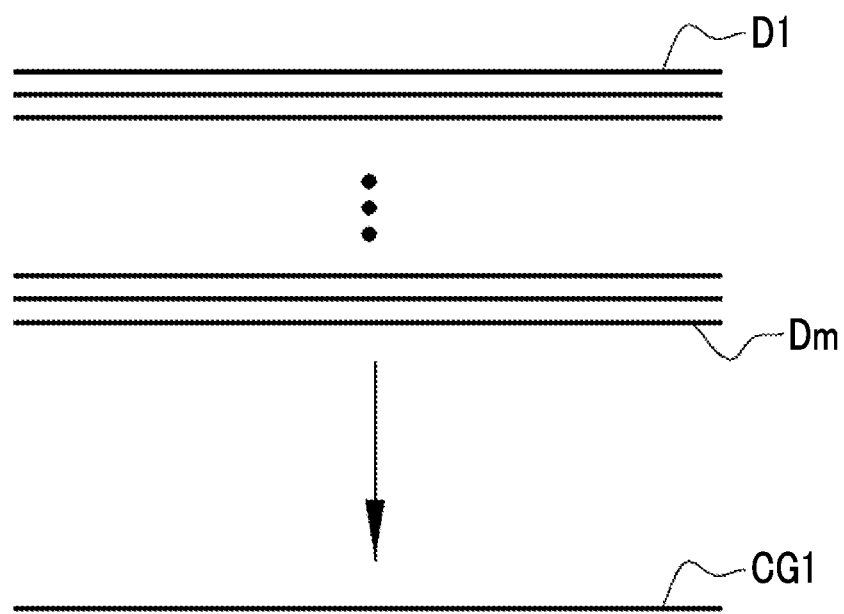
FIG. 7 is a diagram illustrating a method for generating a low-resolution composite two-dimensional image.

The first combination unit 31 performs a generation process of combining the plurality of tomographic images Dj of the tomographic image group SD to generate a composite two-dimensional image CG1. FIG. 7 is a diagram illustrating a method for generating the composite two-dimensional image CG1. As illustrated in FIG. 7, the first combination unit 31 combines the corresponding pixels of the plurality of tomographic images Dj in the depth direction in which the tomographic planes of the tomographic images Dj are arranged (that is, the depth direction of the breast M) to generate the composite two-dimensional image CG1. As a combination method, a well-known composite two-dimensional image generation technique, such as an addition method, an averaging method, a maximum intensity projection method, or a minimum intensity projection method for the pixel values of the corresponding pixels in the plurality of tomographic images Dj, can be used. Here, since the tomographic images Dj have the first resolution, the composite two-dimensional image CG1 also has the first resolution. The composite two-dimensional image CG1 having the first resolution is an example of a "low-resolution composite two-dimensional image" in the technology of the present disclosure. The image processing device 4 generates a high-resolution composite two-dimensional image CG2 having a resolution higher than that of the composite two-dimensional image CG1, in addition to the composite two-dimensional image CG1, which will be described below. Therefore, hereinafter, the composite two-dimensional image CG1 generated by the first combination unit 31 is referred to as a low-resolution composite two-dimensional image CG1.

In the combination of each pixel of the low-resolution composite two-dimensional image CG1, for the tomographic images Dj used for the combination, for example, the corresponding pixels of the tomographic images Dj of all of the tomographic planes may be used to calculate the average value of the pixel values of these pixels or the like. Not the corresponding pixels of all of the tomographic images Dj but the corresponding pixels of some of the tomographic images Dj may be used, and the average value of the pixel values of some pixels or the like may be used. For example, only the pixels of three tomographic images D1, D2, and D3 of three tomographic planes selected from all of the tomographic images Dj may be used, and the average value of the pixel values may be used as the pixel value. In addition, the tomographic planes used for calculating the pixel value may be changed for each pixel of the low-resolution composite two-dimensional image CG1. For example, for a certain pixel, only the pixels of three tomographic images D1, D2, and D3 of three tomographic planes are used, and the average value of the pixel values or the like is used as the pixel value. For other pixels, only the pixels of two tomographic images D2 and D3 of two tomographic planes are used, and the average value of the pixel values or the like is used as the pixel value.

Figure 8:
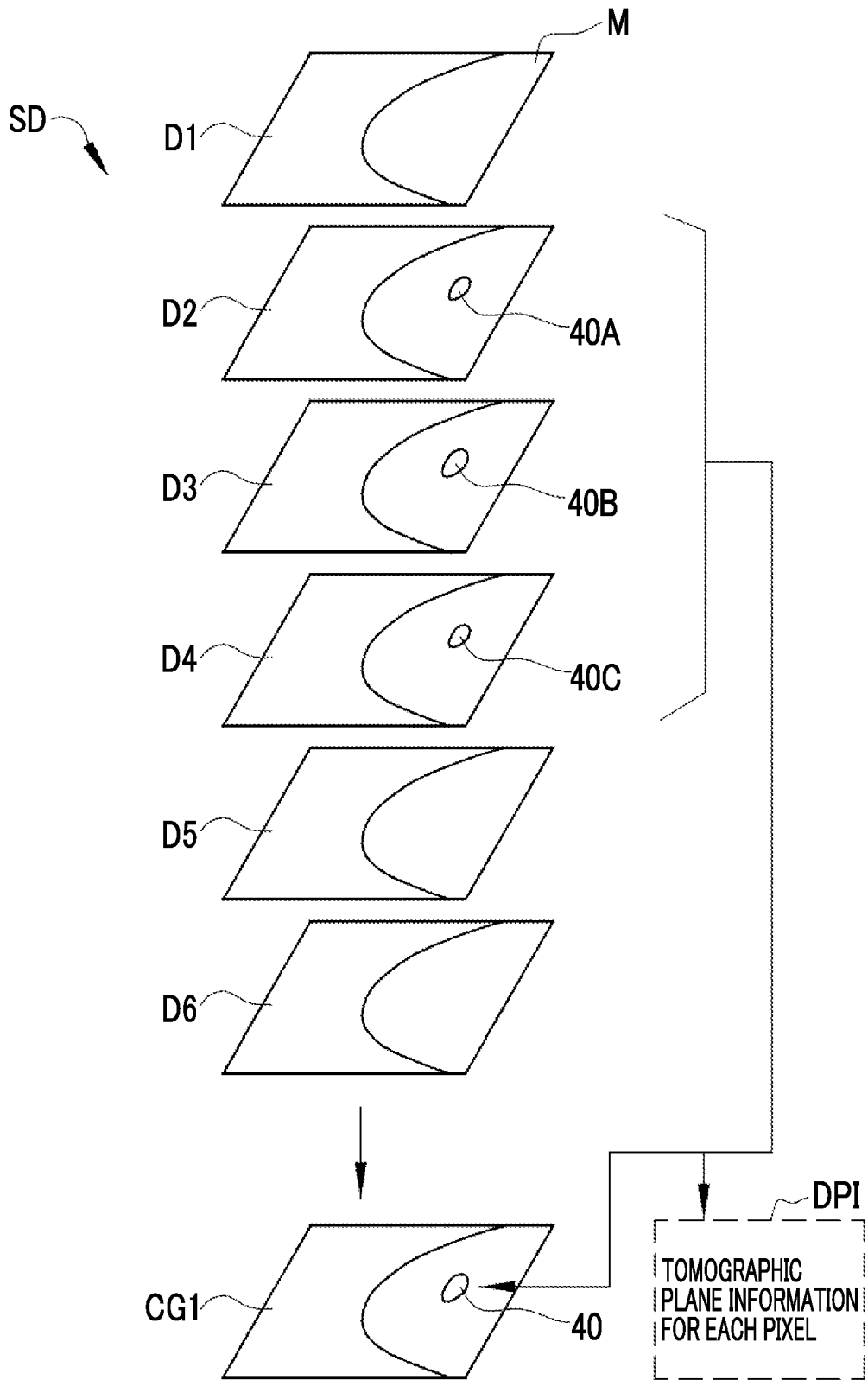
FIG. 8 is a diagram illustrating tomographic plane information for each pixel in the low-resolution composite two-dimensional image.

As illustrated in FIG. 8, in the first embodiment, for a portion in which a structure of interest 40 is present in the tomographic image group SD, the first combination unit 31 selects the tomographic images Dj in which the structure of interest 40 is present. Then, the first combination unit 31 performs combination using only the pixels of the selected tomographic images Dj. For example, in FIG. 8, structures of interest 40A to 40C are present only in the tomographic images D2 to D4 of three tomographic planes, respectively, among the plurality of tomographic images D1 to D6. In this case, the first combination unit 31 extracts pixels in which the structures of interest 40A to 40C are present from the three tomographic images D2 to D4 and performs combination using only the extracted pixels. On the other hand, for a portion of the breast M in which the structure of interest 40 is not present and a blank portion other than the breast M, the first combination unit 31 performs combination using, for example, all of the pixels of the tomographic images Dj.

In addition, the first combination unit 31 records tomographic plane information DPI for each pixel which indicates the tomographic images Dj of the tomographic planes used for each pixel of the low-resolution composite two-dimensional image CG1 in association with the generated low-resolution composite two-dimensional image CG1. The tomographic plane information DPI for each pixel is recorded, for example, as accessory information of the low-resolution composite two-dimensional image CG1.

Figure 9:
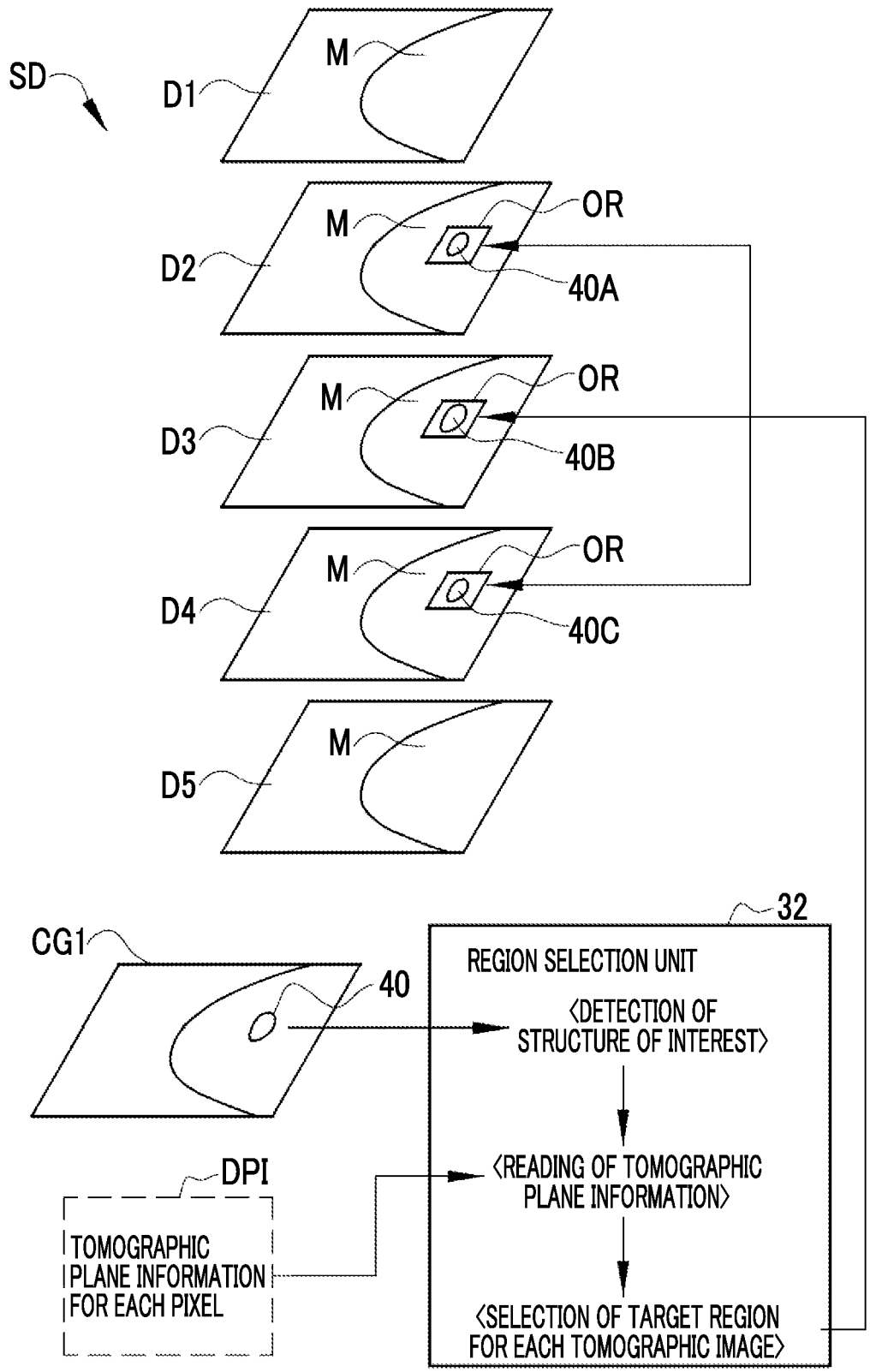
FIG. 9 is a diagram illustrating a method for selecting a target region according to a first embodiment.

As illustrated in FIG. 9, the region selection unit 32 performs a region selection process of selecting a portion of the plurality of tomographic images Dj included in the tomographic image group SD as a target region OR. The region selection unit 32 selects one or more target regions OR from the tomographic image group SD. The target region OR is a region to be set to a second resolution higher than the first resolution and is a region including one or more pixels in each of the tomographic images Dj. The region selection unit 32 selects at least a portion of the tomographic images Dj as the target region OR. Two or more target regions OR may be selected in one tomographic image Dj. In addition, each target region OR may be selected in two or more tomographic images Dj having different depths. In addition, the target region OR may be a portion of the plurality of tomographic images Dj. Therefore, for some tomographic images Dj (for example, two tomographic images among ten tomographic images Dj) included in the plurality of tomographic images Dj, the target region OR may be set in the entire regions of the tomographic images Dj.

Figure 10:
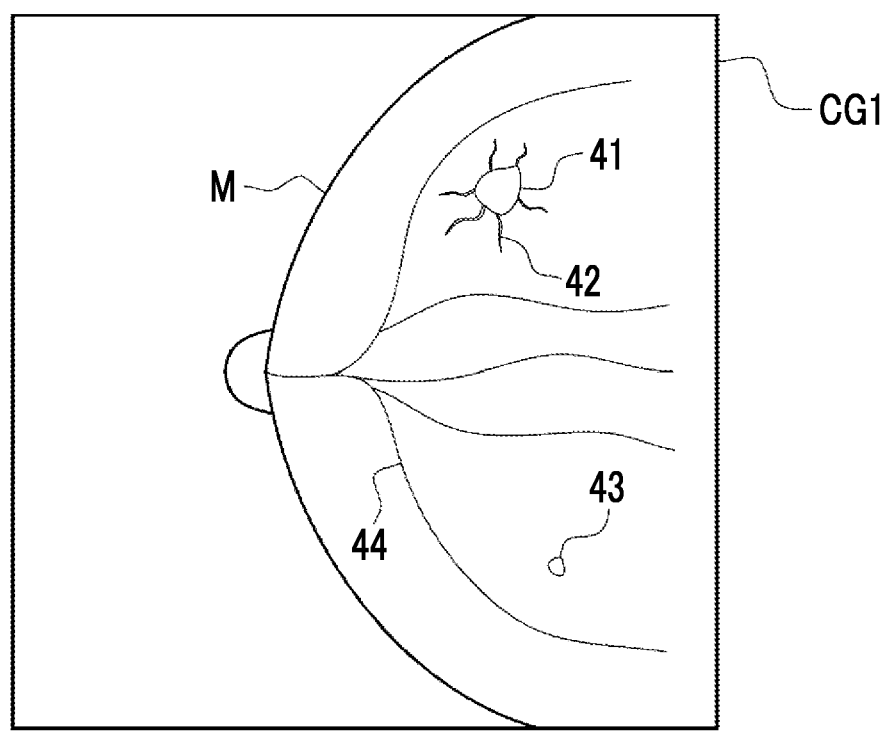
FIG. 10 is a diagram illustrating a structure of interest in a breast.

In the first embodiment, the region selection unit 32 selects a region including the structure of interest 40 in the tomographic images Dj as the target region OR. The region selection unit 32 detects the structure of interest 40 of the breast M using the low-resolution composite two-dimensional image CG1. Specifically, as illustrated in FIG. 10, examples of the structure of interest 40 include a tumor 41, a spicula 42, a calcification 43, and a linear structure 44 included in the breast M. The linear structure 44 is a mammary gland such as a lobule or a mammary duct. The region selection unit 32 may detect all of the tumor 41, the spicula 42, the calcification 43, and the linear structure 44 or may detect at least one of them. Which structure of interest 40 is to be detected is appropriately set.

The region selection unit 32 detects the structure of interest 40 from the low-resolution composite two-dimensional image CG1 using a known computer-aided diagnosis (that is, CAD) algorithm. In the CAD algorithm, the probability (likelihood) that the pixel in the low-resolution composite two-dimensional image CG1 will be the structure of interest is derived, and a pixel having a probability equal to or greater than a predetermined threshold value is detected as the structure of interest. In addition, the CAD algorithm is prepared for each type of structure of interest 40. In this embodiment, a CAD algorithm for detecting the tumor 41, a CAD algorithm for detecting the spicula 42, a CAD algorithm for detecting the calcification 43, and a CAD algorithm for detecting the linear structure 44 are prepared.

Further, the detection of the structure of interest 40 is not limited to the method using the CAD. The structure of interest 40 may be detected from the low-resolution composite two-dimensional image CG1 by a filtering process using a filter for detecting the structure of interest 40, a detection model which has been subjected to machine learning by deep learning and the like to detect the structure of interest, and the like.

As illustrated in FIG. 9, in a case in which the region selection unit 32 has detected the structure of interest 40 in the low-resolution composite two-dimensional image CG1, the region selection unit 32 reads the tomographic plane information DPI for each pixel from the accessory information of the low-resolution composite two-dimensional image CG1. As described above, the tomographic plane information DPI for each pixel is information indicating the tomographic images Dj of the tomographic planes used for each pixel of the low-resolution composite two-dimensional image CG1. The region selection unit 32 specifies the tomographic images Dj of the tomographic planes corresponding to the structure of interest 40 detected from the low-resolution composite two-dimensional image CG1 from the tomographic image group SD on the basis of the tomographic plane information DPI for each pixel. Then, the region selection unit 32 selects a region including the structure of interest 40 in each of the specified tomographic images Dj as the target region OR.

In the example illustrated in FIG. 9, the tomographic images Dj of the tomographic planes corresponding to the structure of interest 40 are the tomographic images D2 to D4. The region selection unit 32 selects regions including the structures of interest 40A to 40C of the tomographic images D2 to D4 as the target regions OR.

Figure 11:
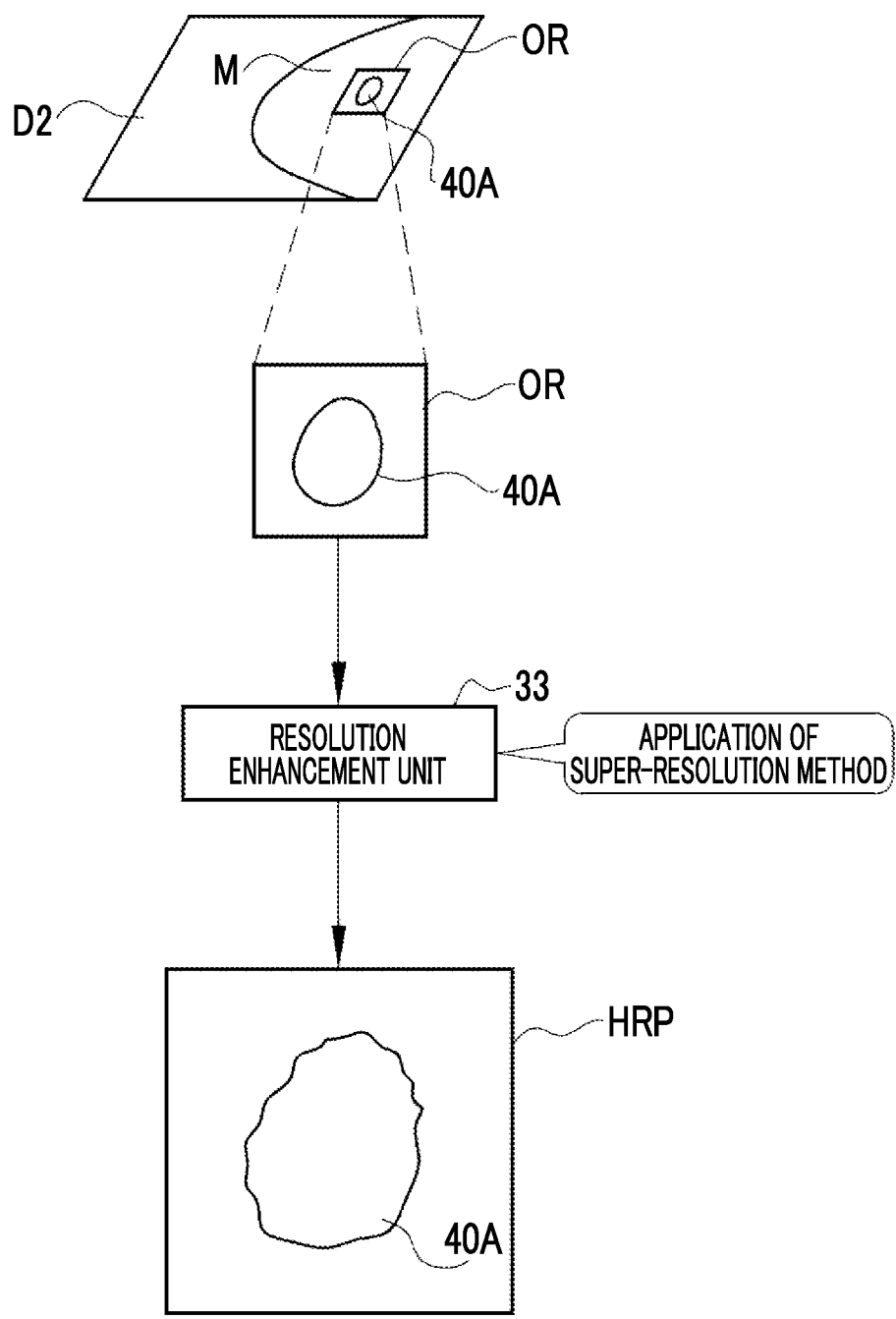
FIG. 11 is a diagram illustrating a resolution enhancement process.

As conceptually illustrated in FIG. 11, the resolution enhancement unit 33 performs a resolution enhancement process of increasing the resolution of the target region OR selected by the region selection unit 32 to the second resolution higher than the first resolution to generate a high-resolution partial image HRP for each target region OR. The second resolution is higher than the first resolution and indicates the number of pixels that is, for example, four times the number of pixels in the first resolution. The resolution enhancement unit 33 does not perform the resolution enhancement process on a region other than the target region OR in the tomographic images Dj. In this way, the resolution enhancement unit 33 performs the resolution enhancement process only on the target region OR to generate the high-resolution partial image HRP of the target region OR. The high-resolution partial image HRP is an image in which the number of pixels is larger than that in the image of the original target region OR and the morphology of the details of the structure of interest 40 (for example, the structure of interest 40A in FIG. 11) is expressed in high definition.

FIG. 11 illustrates a case in which the resolution enhancement process is performed on the target region OR of the tomographic image D2. In a case in which the target region OR is also selected in the tomographic images D3 and D4 as illustrated in FIG. 9, the resolution enhancement process is also performed on the target regions OR of the tomographic images D3 and D4, which is not illustrated.

In this example, as the resolution enhancement process, in a case in which the resolution of one target region OR is increased, a super-resolution method using the tomographic images Dj is applied. The method disclosed in JP2020-025786A can be given as an example of the super-resolution method. The super-resolution method disclosed in JP2020-025786A is a process using a trained model which has been subjected to machine learning to convert an input image into a super-resolution image. The trained model adds a new pixel between the pixels of the input image, interpolates the pixel value of the added new pixel, and outputs a super-resolution image. This trained model is constructed using, for example, any one of a convolutional neural network, a recurrent neural network, or a support vector machine.

In addition, the super-resolution method is not limited to the method disclosed in JP2020-025786A. For example, any high-order interpolation method, such as nearest neighbor interpolation, bilinear interpolation, and bicubic interpolation, can be used. Further, as described in <Daniel Glasner, et al. "Super-Resolution from a Single Image", ICCV, 29 Sep.-2 Oct. 2009>, a method can be used which extracts small regions (called patches) that repeatedly appear from an image and converts the original image into a super-resolution image using the pixel values of the extracted small regions.

Further, in a case in which the tomographic images Dj are used, the high-resolution partial image HRP may be generated using the tomographic images Dj that are vertically adjacent to one tomographic image Dj, in which the target region OR has been selected, in the depth direction in addition to the one tomographic image Dj. For example, for the target region OR selected in the tomographic image D3 in FIG. 9, the target region OR selected in the tomographic image D2 and the target region OR selected in the tomographic image D4 are also used. In this case, the image of the target region OR in the tomographic images D2 to D4 is regarded as a three-dimensional image, and k-neighbor interpolation is performed using k pixels which are located closest to the pixels to be interpolated in the target region OR of the tomographic image D3. In addition, any value, such as 6 or 26, can be used as the value of k.

Figure 12:
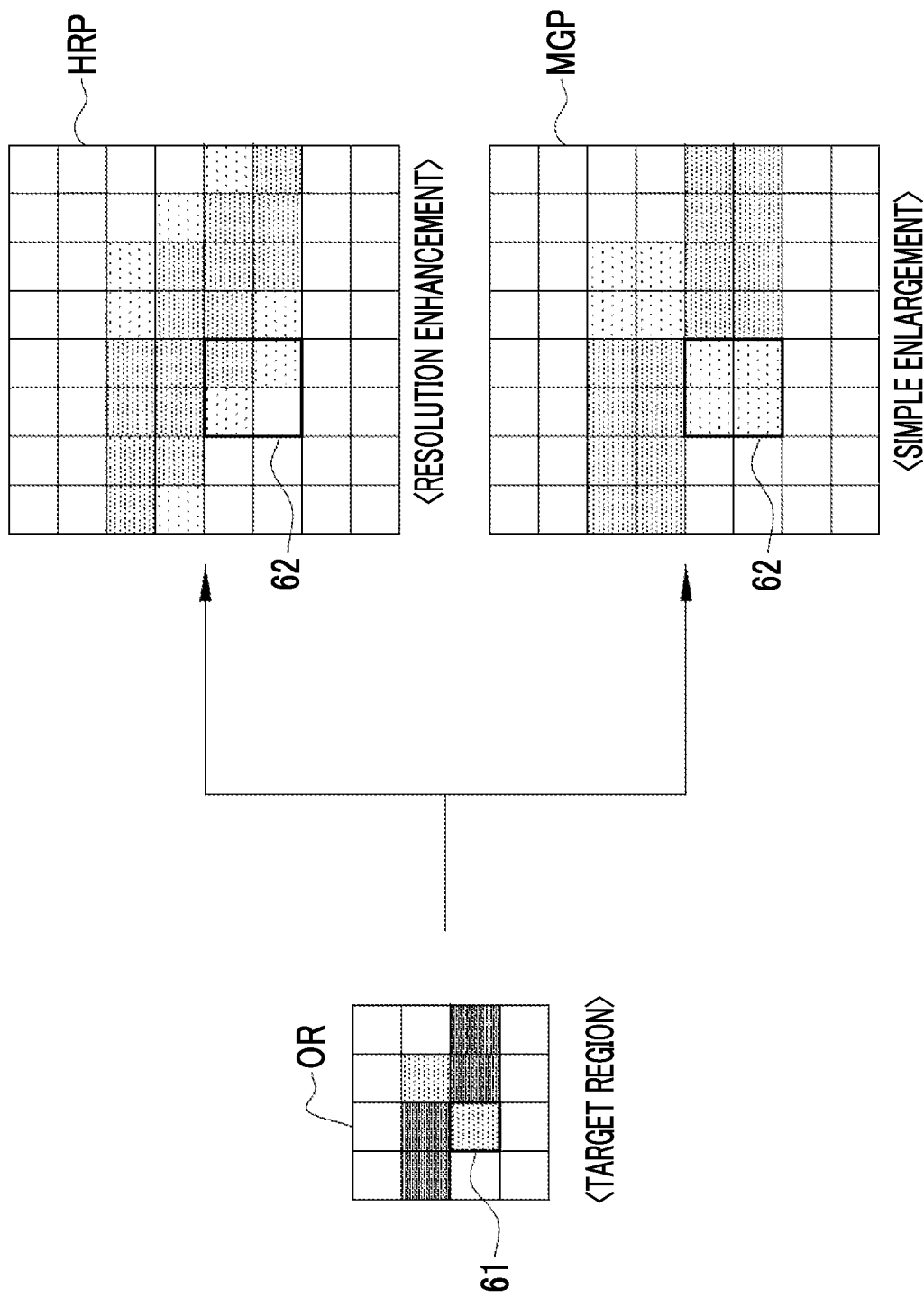
FIG. 12 is a diagram illustrating a difference between resolution enhancement and simple enlargement.

Here, the difference between simple enlargement and resolution enhancement will be described with reference to FIG. 12. FIG. 12 illustrates a case in which 4×4 pixels are converted into 8×8 pixels. In a case in which an image is enlarged in this way, one pixel is increased to 2×2 pixels. An image that has been simply enlarged (hereinafter, simply referred to as a simply enlarged image) MGP is an image in which the pixel value of the original pixel is simply assigned to the pixel values of the increased number of pixels. On the other hand, in the high-resolution partial image HRP, the pixel value of the original pixel is not simply assigned to the pixel values of the increased number of pixels, but the pixel values of the increased number of pixels are interpolated by the pixel values of the surrounding pixels to express the contour of the structure in higher definition. For example, one pixel 61 of the target region OR corresponds to a region 62 of 2×2 pixels in the simply enlarged image MGP and the high-resolution partial image HRP, and all of the pixels in the region 62 of the simply enlarged image MGP have the same pixel value as the pixel 61. On the other hand, the pixels in the region 62 of the high-resolution partial image HRP include a pixel having the same pixel value as the pixel 61 and a pixel having a pixel value different from that of the pixel 61. These pixel values change depending on the density of adjacent pixels.

Figure 13:
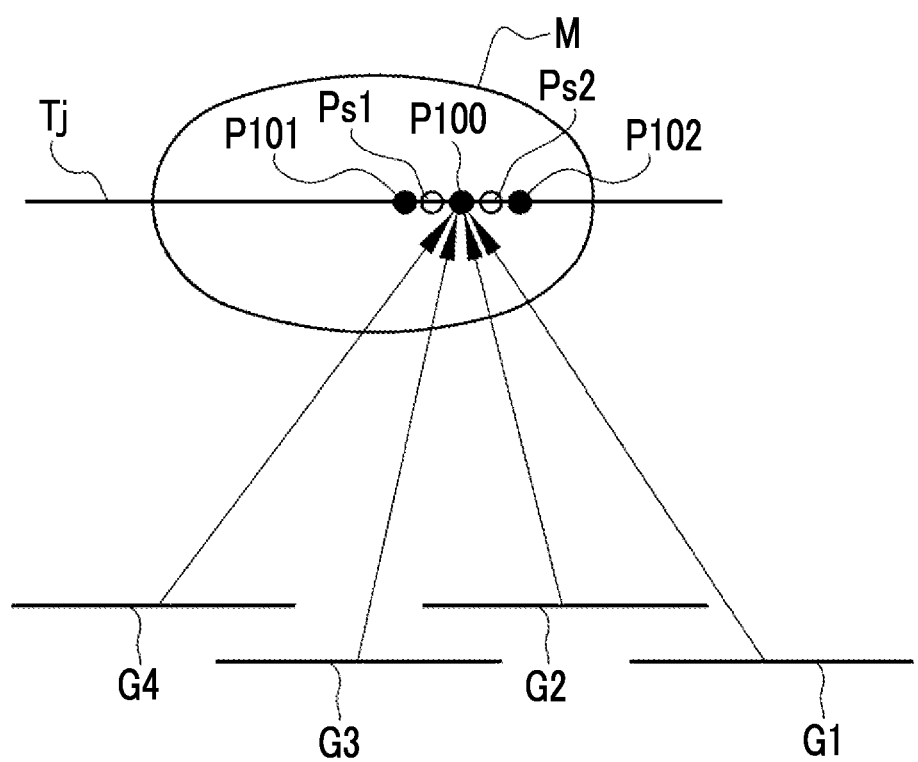
FIG. 13 is a diagram illustrating a resolution enhancement method using a back projection method.

Further, a resolution enhancement method includes a method using the projection images Gi used to reconstruct the tomographic image group SD as illustrated in FIG. 13, in addition to the super-resolution method that increases resolution on the basis of the tomographic images Dj. Instead of the super-resolution method, the method using the projection images Gi may be applied as the method for increasing the resolution of the target region OR.

As the method using the projection images Gi, there is a method that reconstructs the image of the target region OR selected in the tomographic images Dj as the high-resolution partial image HRP from the projection images Gi, using a well-known back projection method such as a simple back projection method. In the example illustrated in FIG. 13, back projection using four projection images G1 to G4 will be described. A pixel value at a coordinate position P100 on a certain tomographic plane Tj in the breast M is calculated by back-projecting the pixel values at the corresponding coordinate position in the projection images G1 to G4. The tomographic image Dj indicating the tomographic plane Tj is reconstructed by performing the back projection for each coordinate position in the tomographic plane Tj. In addition, the tomographic plane Tj (j=1 to m, m is the number of tomographic planes set in reconstruction) is any tomographic plane of the breast M and corresponds to the position of the tomographic image Dj in the depth direction.

The resolution enhancement unit 33 further adds coordinate positions Ps1, Ps2, between the coordinate positions P100 and P101, between the coordinate positions P101 and P102, . . . in the tomographic plane Tj set in a case in which the tomographic image Dj having the first resolution is reconstructed and back-projects the pixel values at the corresponding coordinate position in the projection images G1 to G4 to the added coordinate positions Ps1, Ps2, . . . .

Therefore, pixel values are also calculated for the coordinate positions Ps1, Ps2, added in the tomographic plane Tj. The resolution enhancement unit 33 uses the projection images Gi in this way to generate the high-resolution partial image HRP having the second resolution corresponding to the target region OR.

As described above, in this example, the resolution enhancement unit 33 applies the super-resolution method to the resolution enhancement process. However, the method using the projection images Gi illustrated in FIG. 13 may also be applied.

Figure 14:
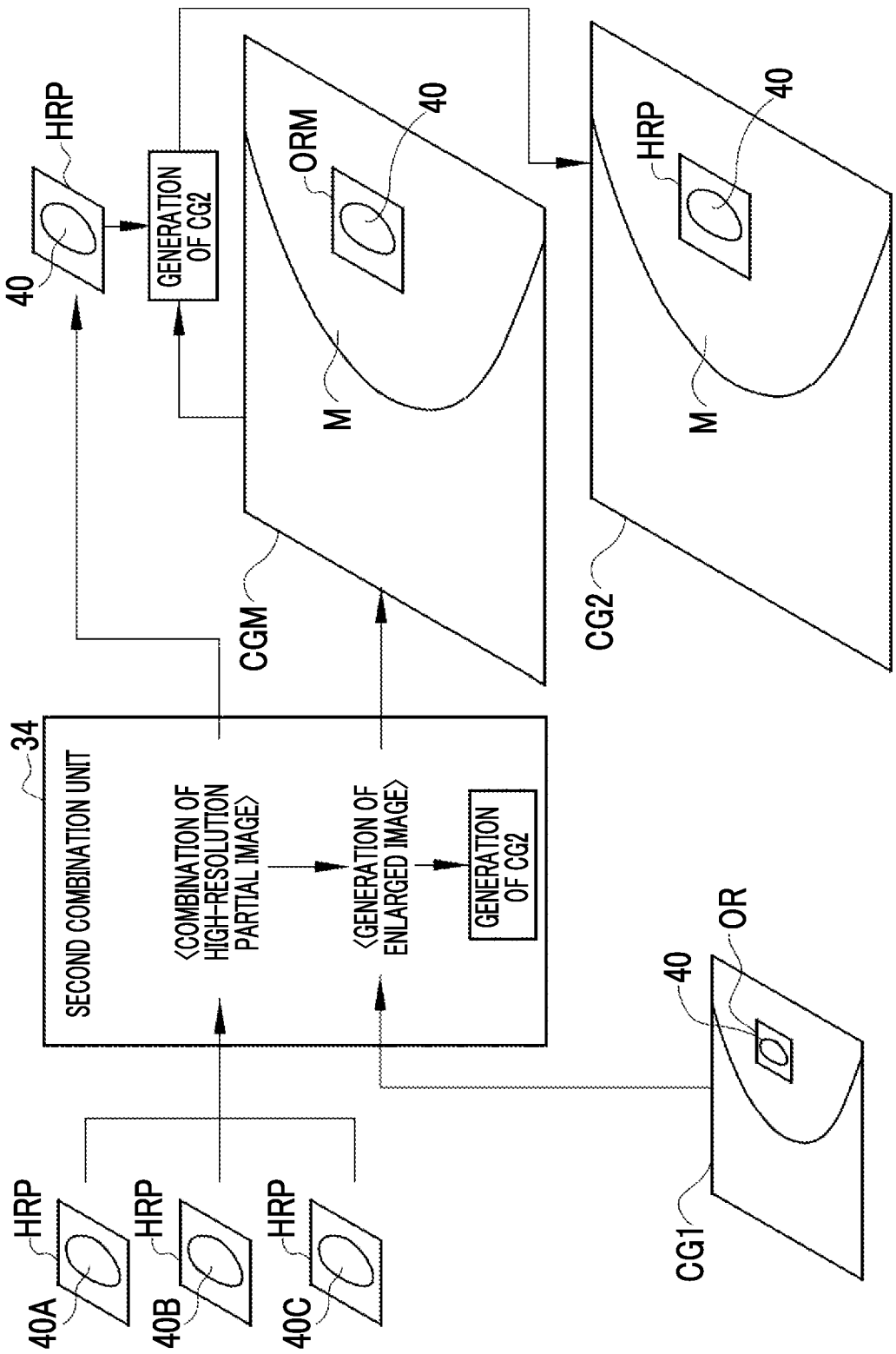
FIG. 14 is a diagram illustrating a method for generating a high-resolution composite two-dimensional image according to the first embodiment.

As illustrated in FIG. 14, the second combination unit 34 performs a composite two-dimensional image generation process of generating a high-resolution composite two-dimensional image CG2 having the second resolution using the high-resolution partial images HRP. In the first embodiment, the second combination unit 34 combines an enlarged image CGM obtained by increasing the number of pixels of the low-resolution composite two-dimensional image CG1 having the first resolution to the number of pixels corresponding to the second resolution with the high-resolution partial image HRP to generate the high-resolution composite two-dimensional image CG2. The enlarged image CGM has the second resolution because it is combined with the high-resolution partial image HRP.

In this example, the enlarged image CGM is generated using the low-resolution composite two-dimensional image CG1 having the first resolution. That is, in the composite two-dimensional image generation process, the second combination unit 34 increases the resolution of the low-resolution composite two-dimensional image CG1 to the second resolution, using the super-resolution method, to generate a temporary high-resolution composite two-dimensional image as the enlarged image CGM. Then, the second combination unit 34 combines the enlarged image CGM, which is the temporary high-resolution composite two-dimensional image, with the high-resolution partial image HRP to generate the high-resolution composite two-dimensional image CG2 having the second resolution.

Figure 15:
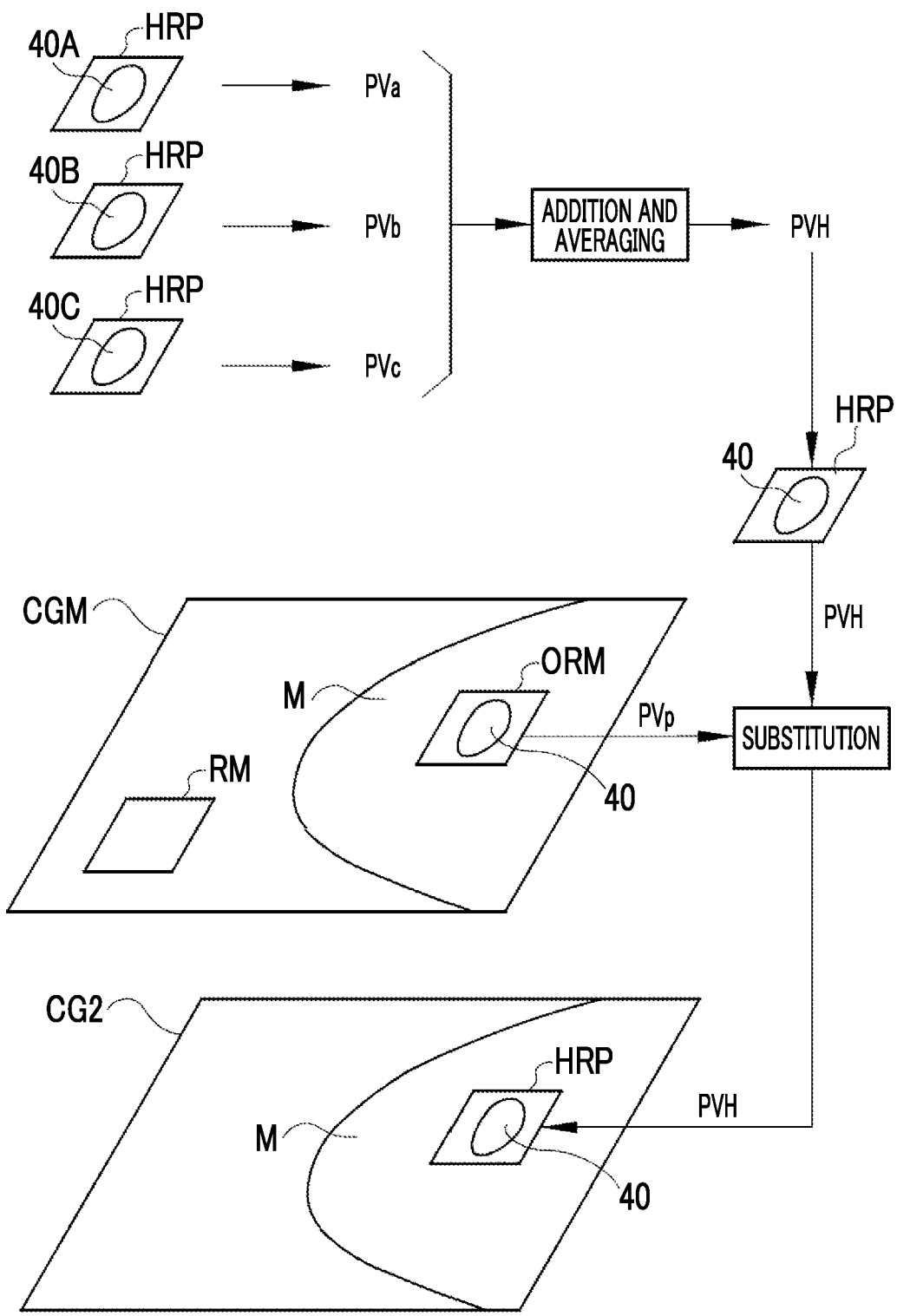
FIG. 15 is a diagram illustrating a method for combining a high-resolution partial image with an enlarged image.
Figure 16:
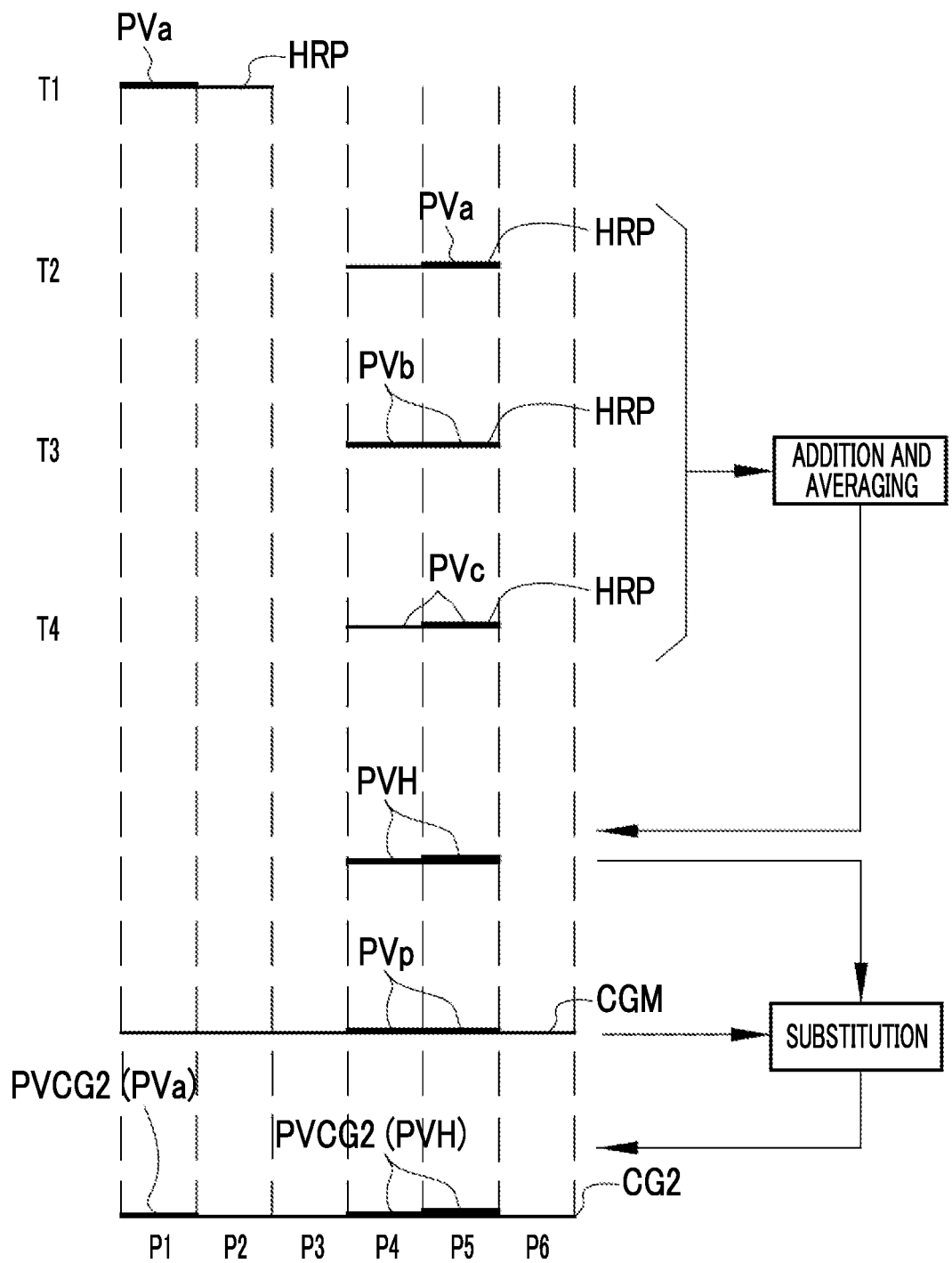
FIG. 16 is a diagram illustrating details of the combination method illustrated in FIG. 15.

As illustrated in FIGS. 15 and 16, the second combination unit 34 combines a plurality of pixels at the corresponding coordinate position in the tomographic planes Tj in an overlap portion, in which a plurality of high-resolution partial images HRP having different depths of the tomographic planes Tj overlap each other in the depth direction of the tomographic planes Tj, to derive pixel values PVCG2 (see FIG. 16) of the high-resolution composite two-dimensional image CG2. In FIG. 16, the tomographic planes T1, T2, T3, and T4 are illustrated. FIG. 16 is a diagram conceptually illustrating a method that combines a plurality of pixels which are in the tomographic planes Tj with different depths and are located at the corresponding coordinate position. Further, in FIG. 16, the magnitude of each of pixel values PVa, PVb, and PVc are indicated by a thickness. As the thickness is larger, the pixel value is larger. In a case in which the pixel values are added, the pixel value increases. Therefore, the thickness also increases.

In FIG. 16, assuming that coordinate positions P4 and P5 are an overlap portion, the second combination unit 34 adds and averages the pixel values PVa, PVb, and PVc of each pixel at the coordinate positions P4 and P5 to derive a pixel value PVH. In addition, as the method for combining each pixel, instead of the addition and averaging, the pixel values PVa, PVb, and PVc of each pixel may be simply added in a range in which they are not saturated. Further, weighted addition and averaging may be used which weights each pixel of each high-resolution partial image HRP and adds and averages the weighted pixel values.

As illustrated in FIGS. 15 and 16, in a case in which the pixel value of an enlarged target region ORM corresponding to the target region OR is a temporary pixel value PVp in the enlarged image CGM, the second combination unit 34 substitutes the temporary pixel value PVp of the enlarged image CGM with the pixel value PVH derived from the high-resolution partial image HRP such that the pixel value PVCG2 of the high-resolution composite two-dimensional image CG2 is obtained.

In addition, as a method for combining the pixels of the enlarged image CGM and the high-resolution partial image HRP, that is, as a method for deriving the pixel value PVCG2, a method other than the substitution method illustrated in FIGS. 15 and 16 may be used. As the method other than the substitution method, for example, the following method can be used: a method that calculates the average value of the temporary pixel value PVp and the pixel value PVH of the high-resolution partial image HRP and substitutes the average value with the temporary pixel value PVp; or a method that adds the pixel value PVp of the high-resolution partial image HRP to the temporary pixel value PVp. Among these methods, the substitution method illustrated in FIGS. 15 and 16 is preferable because it is considered that the high-resolution partial image HRP with high definition can be most reflected. The quality of the temporary high-resolution composite two-dimensional image having the temporary pixel value PVp is lower than that of the high-resolution partial image HRP. The reason is that the substitution method does not use the temporary pixel value PVp, which causes low image quality, in the high-resolution composite two-dimensional image CG2.

In addition, in some cases, a plurality of high-resolution partial images HRP have different sizes and shapes. In this case, a portion in which the plurality of high-resolution partial images HRP do not overlap in the depth direction of the tomographic planes Tj occurs. For portions other than this overlap portion, the pixel value of any one of the plurality of high-resolution partial images HRP is set as the pixel value PVCG2 of the high-resolution composite two-dimensional image CG2. For example, in FIG. 16, at the coordinate position P1, only the high-resolution partial image HRP of the tomographic plane T1 is present and does not overlap other high-resolution partial images HRP in the depth direction of the tomographic planes Tj. In this case, the pixel value PVa of the high-resolution partial image HRP of the tomographic plane T1 is set as the pixel value PVCG2 of the high-resolution composite two-dimensional image CG2 at the coordinate position P1.

Further, as illustrated in FIGS. 14 and 15, in this example, since the target region OR is a region including the structure of interest 40, the high-resolution partial image HRP is generated only for the region including the structure of interest 40 and is not generated for the other regions. Therefore, for a region, such as an enlarged region RM illustrated in FIG. 15, in which the high-resolution partial image HRP is not combined in the enlarged image CGM, the temporary pixel value PVp of the enlarged image CGM is the pixel value PVCG2 of the high-resolution composite two-dimensional image CG2.

Figure 17:
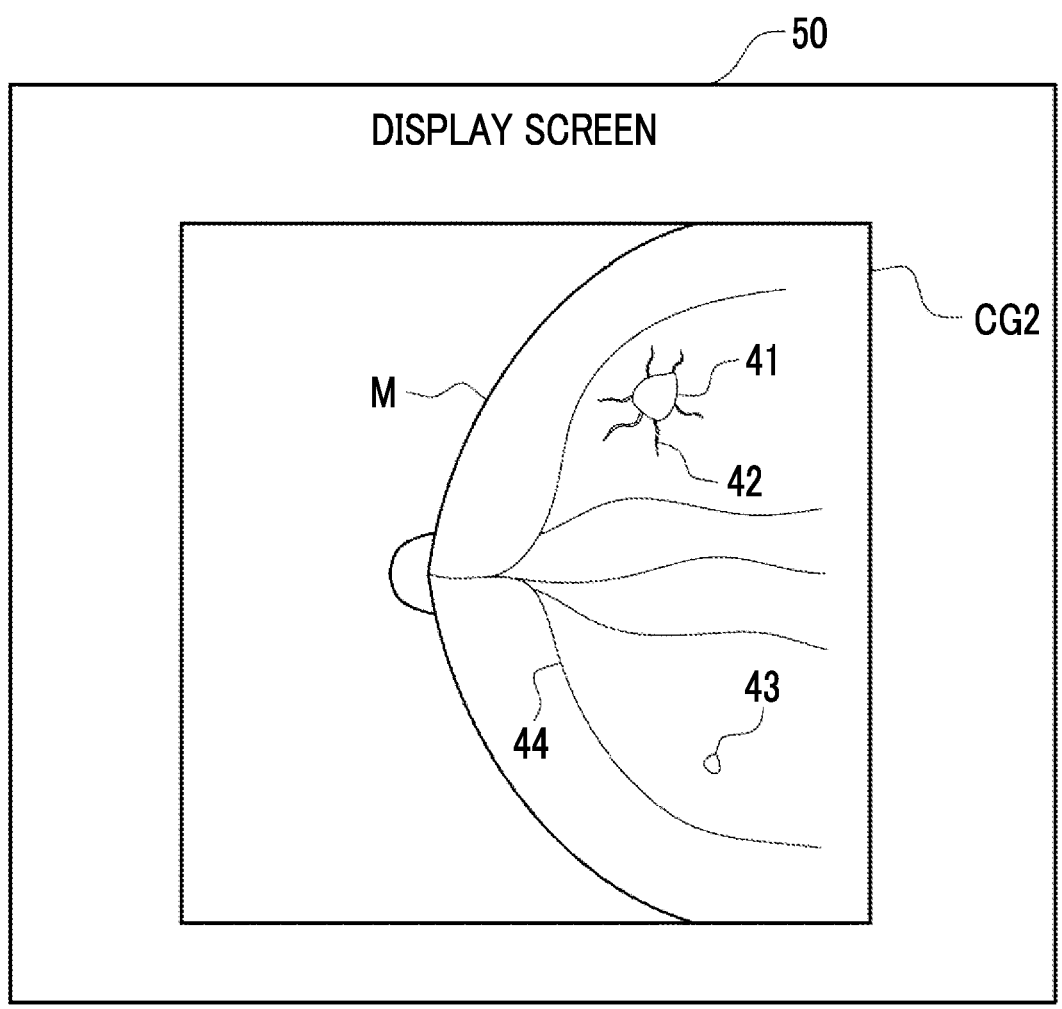
FIG. 17 is a diagram illustrating a display screen for the high-resolution composite two-dimensional image.

As illustrated in FIG. 17, the display control unit 35 displays the high-resolution composite two-dimensional image CG2 generated by the second combination unit 34 on the display 24. Reference numeral 50 indicates an example of a display screen 50 on which the high-resolution composite two-dimensional image CG2 is displayed in the display 24.

Figure 18:
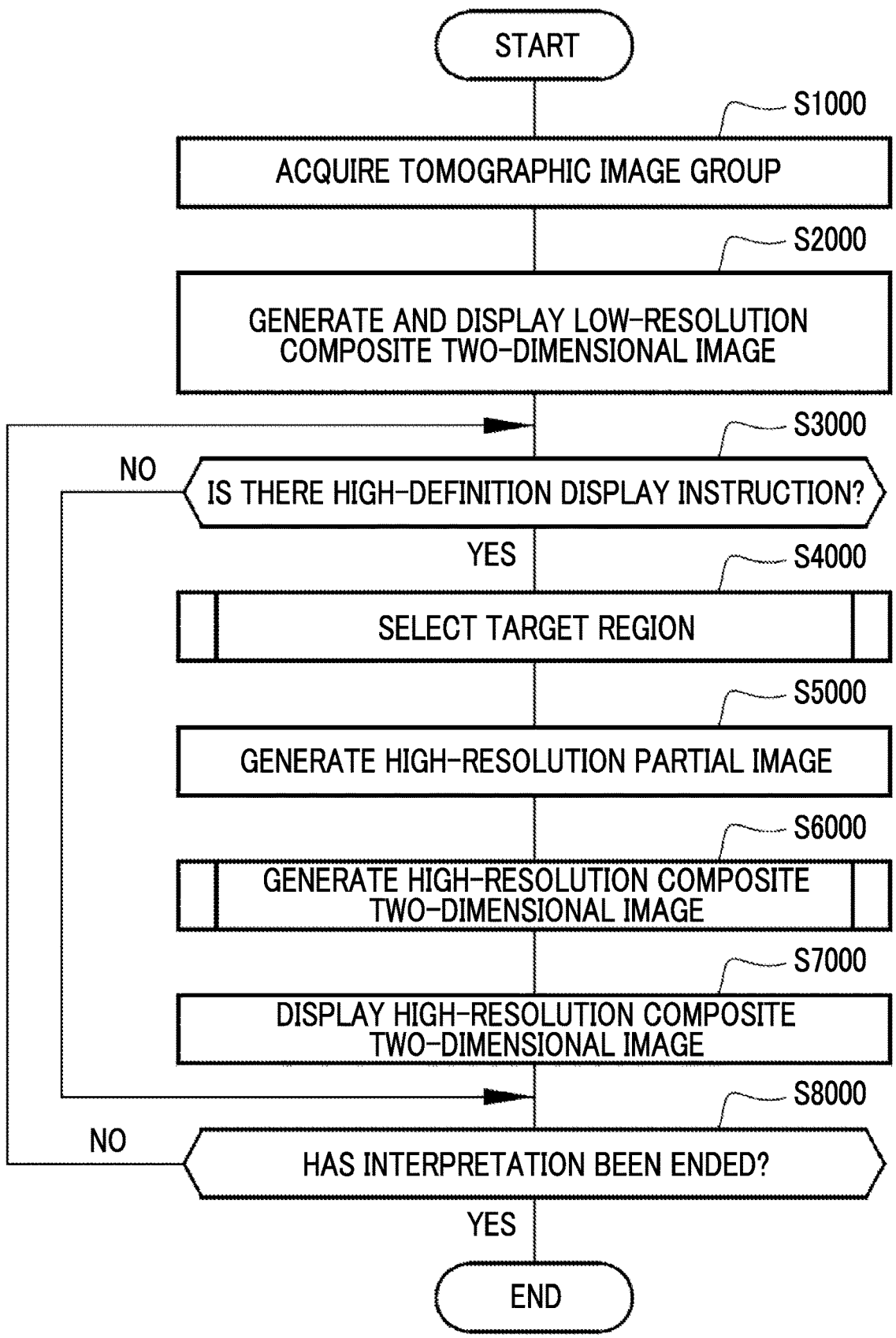
FIG. 18 is a main flowchart illustrating a process according to the first embodiment.
Figure 19:
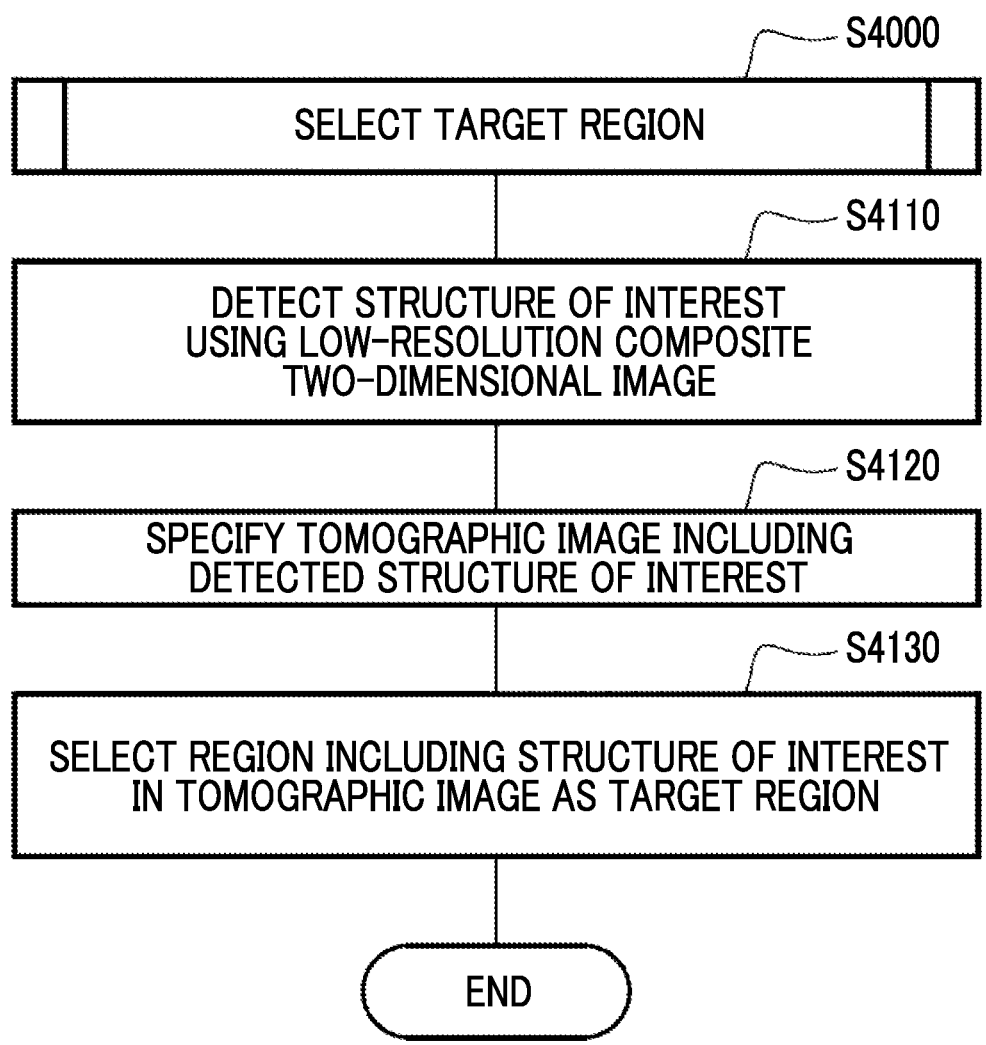
FIG. 19 is a sub-flowchart illustrating a region selection process according to the first embodiment.
Figure 20:
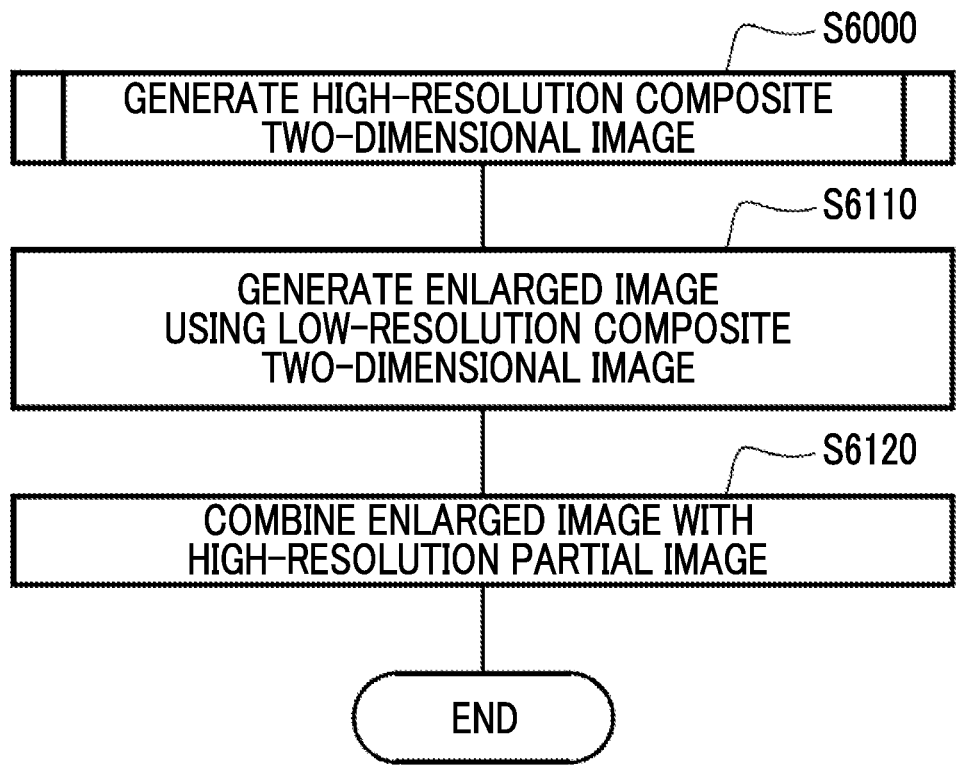
FIG. 20 is a sub-flowchart illustrating a composite two-dimensional image generation process according to the first embodiment.

The operation of the configuration according to the first embodiment will be described with reference to flowcharts illustrated in FIGS. 18 to 20. FIG. 18 is a main flowchart, and FIGS. 19 and 20 are sub-flowcharts illustrating the details of some steps of the main flowchart. In a case in which the tomographic image group SD is interpreted, an operator, such as a doctor, operates the image processing device 4 to start the interpretation. In a case in which an instruction is received from the operator through the input device 25, the image acquisition unit 30 of the image processing device 4 acquires the tomographic image group SD to be interpreted from, for example, the image storage system 3 (Step S1000).

Further, in a case in which an instruction to generate the low-resolution composite two-dimensional image CG1 having the first resolution is input, the first combination unit 31 combines a plurality of tomographic images Dj in the tomographic image group SD to generate the low-resolution composite two-dimensional image CG1 and displays the generated low-resolution composite two-dimensional image CG1 on the display 24 (Step S2000). Furthermore, in a case in which a high-definition display instruction, which is a request for displaying an image with higher definition than the low-resolution composite two-dimensional image CG1, is input (YES in Step S3000), the image processing device 4 starts a process for generating the high-resolution composite two-dimensional image CG2 having the second resolution higher than the first resolution. First, the region selection unit 32 performs a region selection process of selecting the target region OR whose resolution is to be increased (Step S4000).

As illustrated in FIG. 19, in the region selection process, the region selection unit 32 detects the structure of interest 40 using the low-resolution composite two-dimensional image CG1 (Step S4110). The region selection unit 32 specifies the tomographic images Dj including the detected structure of interest 40 (Step S4120). As illustrated in FIG. 9, the region selection unit 32 specifies the tomographic images Dj including the structure of interest 40 with reference to the tomographic plane information DPI for each pixel which is recorded as the accessory information of the low-resolution composite two-dimensional image CG1. Then, the region selection unit 32 selects a region including the structure of interest 40 in the tomographic images Dj as the target region OR (Step S4130).

In FIG. 18, in a case in which the target region OR is selected, the resolution enhancement unit 33 performs a resolution enhancement process of increasing the resolution of the target region OR to the second resolution to generate the high-resolution partial image HRP for each target region OR (Step S5000). In this example, the super-resolution method using the tomographic images Dj is used as the resolution enhancement method.

Then, the second combination unit 34 performs a composite two-dimensional image generation process of generating the high-resolution composite two-dimensional image CG2 having the second resolution using the high-resolution partial image HRP (Step S6000). As illustrated in FIG. 20, in the process of Step S6000, the second combination unit 34 generates the enlarged image CGM using the low-resolution composite two-dimensional image CG1 (Step S6110). In Step S6110 of this example, as illustrated in FIG. 14, the second combination unit 34 increases the resolution of the low-resolution composite two-dimensional image CG1 to the second resolution to generate a temporary high-resolution composite two-dimensional image as the enlarged image CGM. As the resolution enhancement method, a super-resolution method based on the low-resolution composite two-dimensional image CG1 is used. In addition, in the procedure illustrated in FIG. 18, after the high-resolution partial image HRP is generated in Step S5000, the enlarged image CGM is generated. However, the enlarged image CGM may be generated before the high-resolution partial image HRP is generated (that is, before Step S5000).

In Step S6120, the second combination unit 34 combines the enlarged image CGM, which is the temporary high-resolution composite two-dimensional image, with the high-resolution partial image HRP using the method illustrated in FIGS. 14 to 16. Therefore, the high-resolution composite two-dimensional image CG2 is generated.

In Step S7000 of FIG. 18, the display control unit 35 displays the generated high-resolution composite two-dimensional image CG2 on the display 24 as illustrated in FIG. 17. In the high-resolution composite two-dimensional image CG2, since the high-resolution partial image HRP is used, image quality higher than that of the low-resolution composite two-dimensional image CG1 is obtained at least in the portion in which the high-resolution partial image HRP is used. The processes in Step S3000 and the subsequent steps are repeated until the interpretation is ended in Step S8000.

As described above, in the technology of the present disclosure, the image processing device 4 performs the region selection process of selecting a portion of the tomographic image group SD including a plurality of tomographic images Dj, which indicate a plurality of tomographic planes Tj of the object, respectively, and have the first resolution, as the target region OR to be set to the second resolution higher than the first resolution, the resolution enhancement process of increasing the resolution of the target region OR to the second resolution to generate the high-resolution partial image HRP, and the composite two-dimensional image generation process of generating the high-resolution composite two-dimensional image CG2 having the second resolution using the high-resolution partial image HRP.

As described above, a portion of the plurality of tomographic images Dj included in the tomographic image group SD is selected as the target region OR, and the high-resolution partial image HRP of the selected target region OR is generated. Therefore, it is possible to suppress a load on data processing, such as a processing time required for resolution enhancement, a storage capacity, a transmission time, as compared to a case in which the resolution of all of the plurality of tomographic images Dj included in the tomographic image group SD is increased.

In addition, since the resolution of the image of the target region OR selected in the tomographic image Dj is increased, the high-resolution composite two-dimensional image CG2 with high definition is obtained as compared to a case in which the resolution of the low-resolution composite two-dimensional image CG1 having the first resolution is increased.

That is, in the tomographic images Dj, the structure of interest 40 extending in the depth direction is separately drawn. Therefore, in the high-resolution partial image HRP obtained by increasing the resolution of the tomographic image Dj having the first resolution to the second resolution, it is possible to express the morphology of the details of the structure of interest 40 in high definition, as compared to a case in which the resolution of the low-resolution composite two-dimensional image CG1 is increased. In addition, since the plurality of tomographic images Dj having the first resolution are combined, the morphological information of the details of the structure of interest 40 drawn in each of the tomographic images Dj is lost in the low-resolution composite two-dimensional image CG1. Therefore, even in a case in which the resolution is increased in this state, the details of the structure of interest 40 may not be reproduced in high definition. According to the technology of the present disclosure, the high-resolution composite two-dimensional image CG2 is generated using the high-resolution partial images HRP obtained by increasing the resolution of the tomographic images Dj before being combined. Therefore, it is possible to reproduce the details of the structure of interest 40 in high definition.

Even in the use of the high-resolution partial images HRP obtained by increasing the resolution of the tomographic images Dj, in a case in which a plurality of high-resolution partial images HRP overlap each other in the depth direction, the pixels are combined in the depth direction. Therefore, the morphological information of the details of the structure of interest 40 drawn in each of the high-resolution partial images HRP is partially lost.

However, in the high-resolution partial image HRP which is a high-resolution tomographic image, the morphology of the details of the structure of interest 40 is expressed in higher definition than in the low-resolution tomographic image Dj. Therefore, in a case in which the high-resolution partial images HRP are combined to generate the high-resolution composite two-dimensional image CG2, the amount of information of the original image before combination is large, and thus the morphology of the details of the structure of interest 40 can be represented more accurately, as compared to a case in which the resolution of the low-resolution composite two-dimensional image CG1 is directly increased. Therefore, as described above, the high-resolution composite two-dimensional image CG2 with high definition is obtained as compared to a case in which the resolution of the low-resolution composite two-dimensional image CG1 is increased.

Specifically, in a case in which the calcification 43 is present as the structure of interest 40 over a plurality of tomographic planes Tj having different depths and the tomographic images Dj of the tomographic planes Tj are combined, the shapes of a plurality of calcifications 43 present in the plurality of tomographic planes Tj may overlap each other and may be drawn as one cluster of calcifications 43 on the low-resolution composite two-dimensional image CG1. In a case in which the tomographic images Dj are combined after the resolution thereof is increased as in the technology of the present disclosure, the combination is performed after the shape of the calcification 43 in each of the tomographic planes Tj is reproduced in higher definition. Therefore, even in a case in which morphological information is lost in the process of combining the plurality of high-resolution partial images HRP, it is possible to more accurately express the shape of the calcification 43 in each of the tomographic planes Tj, as compared to a case in which the resolution of the low-resolution composite two-dimensional image CG1 is increased.

Further, in this example, the region selection unit 32 selects a region including the structure of interest 40 as the target region OR whose high-resolution partial image HRP is to be generated. Since the structure of interest 40 has a high degree of attention in a diagnosis such as interpretation, the high-resolution composite two-dimensional image CG2 in which the structure of interest 40 has been displayed in high definition is highly useful in the diagnosis.

As illustrated in FIG. 10, in a case in which the object is the breast, at least one of the tumor 41, the calcification 43, the spicula 42, or the linear structure 44 is set as the structure of interest 40 to be detected. A few percent of the tumor 41 is likely to be malignant. The spicula 42 is a finding characteristic of hard cancer or invasive lobular cancer. The calcification 43 is likely to become cancerous. Lesions, such as the tumor 41, the spicula 42, and the calcification 43, are likely to occur in the linear structure 44. Therefore, in a case in which at least one of the tumor 41, the spicula 42, the calcification 43, or the linear structure 44 is set as the structure of interest 40, the high-resolution composite two-dimensional image CG2 useful for the diagnosis of the breast is obtained.

Further, in this example, the region selection unit 32 detects the structure of interest 40 using the low-resolution composite two-dimensional image CG1 in the region selection process. In the interpretation of the tomographic image group SD, it is considered that, in many cases, the low-resolution composite two-dimensional image CG1 is generated and displayed at an initial stage of an interpretation operation, as illustrated in the flowchart of FIG. 18 as an example. Therefore, as the workflow of the interpretation, for example, a workflow is considered which observes the low-resolution composite two-dimensional image CG1, determines whether or not the structure of interest 40 is present, and observes the high-definition image of that portion in a case in which the structure of interest 40 is present. Therefore, the use of the low-resolution composite two-dimensional image CG1 as the detection source of the structure of interest 40 is suitable for this workflow. In addition, since the amount of data of the low-resolution composite two-dimensional image CG1 is less than that of the tomographic image group SD, it is possible to detect the structure of interest 40 in a short time as compared to a case in which the structure of interest 40 is detected using the tomographic image group SD.

In addition, the structure of interest 40 may be detected using the tomographic image group SD or may be detected using the temporary high-resolution composite two-dimensional image generated as the enlarged image CGM. In a case in which the structure of interest 40 is detected using the temporary high-resolution composite two-dimensional image, it is necessary to convert the coordinate position of the detected structure of interest 40 according to the resolution of the tomographic image Dj since the temporary high-resolution composite two-dimensional image is the enlarged image CGM. Since the low-resolution composite two-dimensional image CG1 has the same resolution as the tomographic image Dj, it is not necessary to perform a coordinate position conversion process. In this sense, it is preferable to detect the structure of interest 40 using the low-resolution composite two-dimensional image CG1.

In addition, in this example, in the composite two-dimensional image generation process, the second combination unit 34 combines the enlarged image CGM obtained by increasing the number of pixels of the low-resolution composite two-dimensional image CG1 to the number of pixels corresponding to the second resolution with the high-resolution partial image HRP to generate the high-resolution composite two-dimensional image CG2. According to this method, the enlarged image CGM based on the low-resolution composite two-dimensional image CG1 can be used for a region other than the high-resolution partial image HRP. Therefore, it is possible to reduce the processing time, as compared to a case in which other regions are generated from the tomographic images Dj.

Further, in this example, in the composite two-dimensional image generation process, the second combination unit 34 generates, as the enlarged image CGM, the temporary high-resolution composite two-dimensional image obtained by increasing the resolution of the low-resolution composite two-dimensional image CG1 to the second resolution and combines the temporary high-resolution composite two-dimensional image with the high-resolution partial image HRP to generate the high-resolution composite two-dimensional image CG2. Therefore, in the high-resolution composite two-dimensional image CG2, a region other than the high-resolution partial image HRP can also be expressed in higher definition than the simply enlarged image of the low-resolution composite two-dimensional image CG1.

In addition, instead of the temporary high-resolution composite two-dimensional image, an image obtained by simply enlarging the low-resolution composite two-dimensional image CG1, such as the simply enlarged image MGP illustrated in FIG. 12, may be used as the enlarged image CGM. Even in this case, a portion in which the high-resolution partial image HRP is used is expressed in high definition.

Second Embodiment

Figure 21:
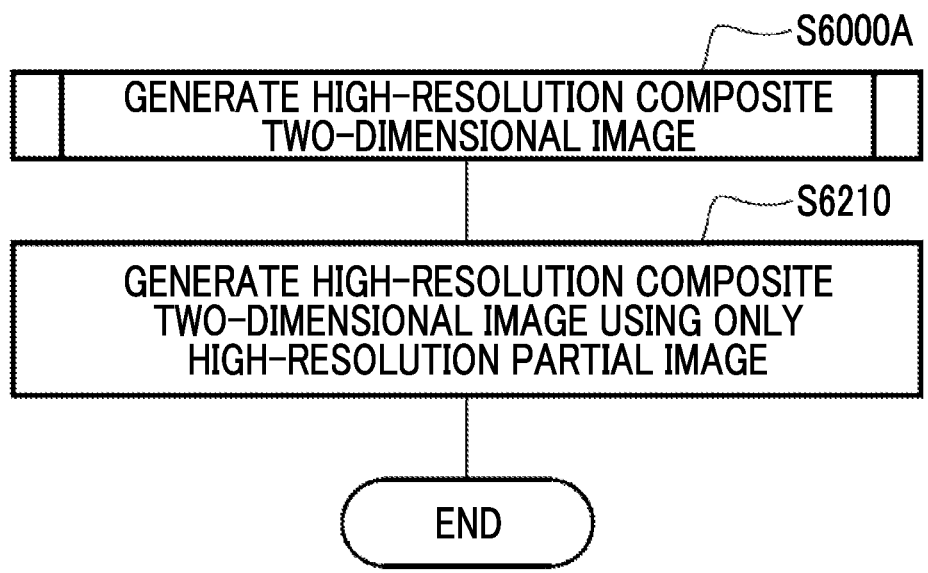
FIG. 21 is a sub-flowchart illustrating a composite two-dimensional image generation process according to a second embodiment.
Figure 22:
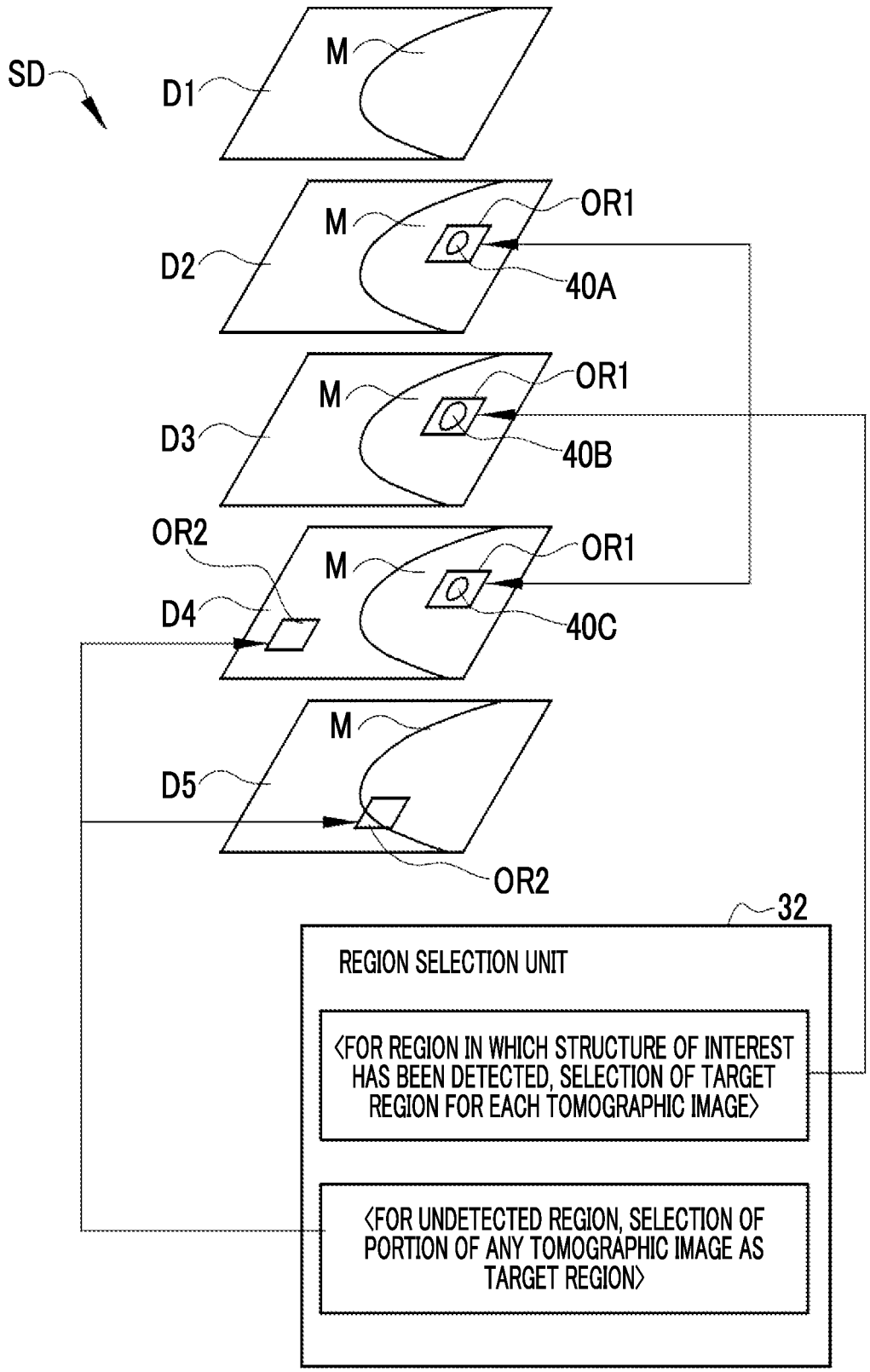
FIG. 22 is a diagram illustrating a method for selecting a target region according to the second embodiment.

A second embodiment illustrated in FIGS. 21 and 22 is an example in which the high-resolution composite two-dimensional image CG2 is generated using only the high-resolution partial image HRP without using the enlarged image CGM unlike the first embodiment. A main flowchart in the second embodiment is the same as that in the first embodiment illustrated in FIG. 18 and is different from that in the first embodiment in the content of the composite two-dimensional image generation process in Step S6000 in the first embodiment. In the second embodiment, Step S6000A illustrated in FIG. 21 is performed instead of Step S6000 illustrated in FIG. 20. As illustrated in FIG. 21, in the composite two-dimensional image generation process (Step S6000A), the second combination unit 34 generates the high-resolution composite two-dimensional image CG2 using only a plurality of high-resolution partial images HRP (Step S6210).

In addition, in the second embodiment, the enlarged image CGM is not used unlike the first embodiment. Therefore, for an undetected region in which the structure of interest 40 is not detected, as illustrated in FIG. 22, a partial region in any of the tomographic images Dj is selected as a target region OR2. For example, a method for selecting one or more tomographic images Dj for each pixel of the undetected region is as follows. For the undetected region in which the structure of interest 40 is not detected in the plurality of tomographic images Dj, the region selection unit 32 compares the pixel values of a plurality of pixels which have different depths in the tomographic planes Tj and are located at the corresponding coordinate position in the tomographic planes Tj. Then, the region selection unit 32 selects one pixel extracted on the basis of the comparison result as the target region OR2 at the coordinate position. For example, the comparison result is a result indicating which pixel has the largest pixel value or which pixel has the smallest pixel value. One pixel having the largest or smallest pixel value is extracted on the basis of the comparison result. This process is performed for each pixel in the undetected region.

In the example illustrated in FIG. 22, a portion of the tomographic image D4 is selected for a certain target region OR2, and a portion of the tomographic image D5 is selected for another target region OR2. Further, in the example illustrated in FIG. 22, the target region OR2 is shown as a region including a plurality of pixels. However, the target region OR2 is selected for each pixel.

Further, the resolution enhancement unit 33 increases the resolution of the target region OR2 to the second resolution, in addition to the target region OR1 in which the structure of interest 40 has been detected, to generate a high-resolution partial image HRP corresponding to the target region OR2. Since the selection of the target region OR2 is performed for each pixel, the minimum size of the target region OR2 is one pixel. However, in a case in which a plurality of pixels are included, the super-resolution method or the method using the projection images Gi can be similarly used to increase the resolution. The second combination unit 34 generates the high-resolution composite two-dimensional image CG2, using the high-resolution partial images HRP of the target region OR1 in which the structure of interest 40 has been detected and the target region OR2 which is the undetected region.

Further, in a case in which only one tomographic image Dj is selected on the basis of the comparison result of the pixel values of the pixels in the undetected region as in this example, the target region OR2 is selected in the selected tomographic image Dj. However, a plurality of tomographic images Dj may be selected on the basis of the comparison result of the pixel values. For example, there is a case in which two tomographic images of a tomographic image Dj having a pixel with the largest pixel value and a tomographic image Dj having a pixel with the second largest pixel value are selected. For example, a process in this case is as follows. In a case in which a plurality of tomographic images Dj are selected for each pixel of the undetected region, the target region OR2 is selected in each of the selected plurality of tomographic images Dj. Then, the high-resolution partial image HRP is generated for each target region OR2. In this case, a plurality of high-resolution partial images HRP which have the corresponding coordinate positions and have different depths are generated even for the undetected region.

In this case, the pixel value PVH after combination is derived by adding and averaging the pixel values of the pixels at the corresponding coordinate position as in the method for combining the pixels of a plurality of high-resolution partial images HRP illustrated in FIG. 16. Then, the derived pixel value PVH is set as the pixel value PVCG2 of the high-resolution composite two-dimensional image CG2. In addition, as described above, as the method for combining each pixel, instead of the addition and averaging, simple addition may be performed in a range in which the pixel value of each pixel is not saturated. Further, weighted addition and averaging may be used which weights each pixel of each high-resolution partial image HRP and adds and averages the weighted pixel values.

In the second embodiment, the entire high-resolution composite two-dimensional image CG2 is generated using a plurality of high-resolution partial images HRP obtained by increasing the resolution of a portion of the plurality of tomographic images Dj. Therefore, the high-resolution composite two-dimensional image CG2 having high image quality in the entire region including the undetected region is obtained as compared to the first embodiment in which the enlarged image CGM is used for the undetected region.

In addition, for the undetected region, the tomographic image Dj is selected for each pixel, and the selected pixel is selected as the target region OR2. Therefore, since there is no process of increasing the resolution of all of the tomographic images Dj, a processing load is reduced.

Third Embodiment

A third embodiment is mainly different from the first embodiment and the second embodiment in a method for selecting the target region OR. In the third embodiment, the target region OR is selected by setting a region of interest 56 in each of the tomographic images Dj.

Figure 23:
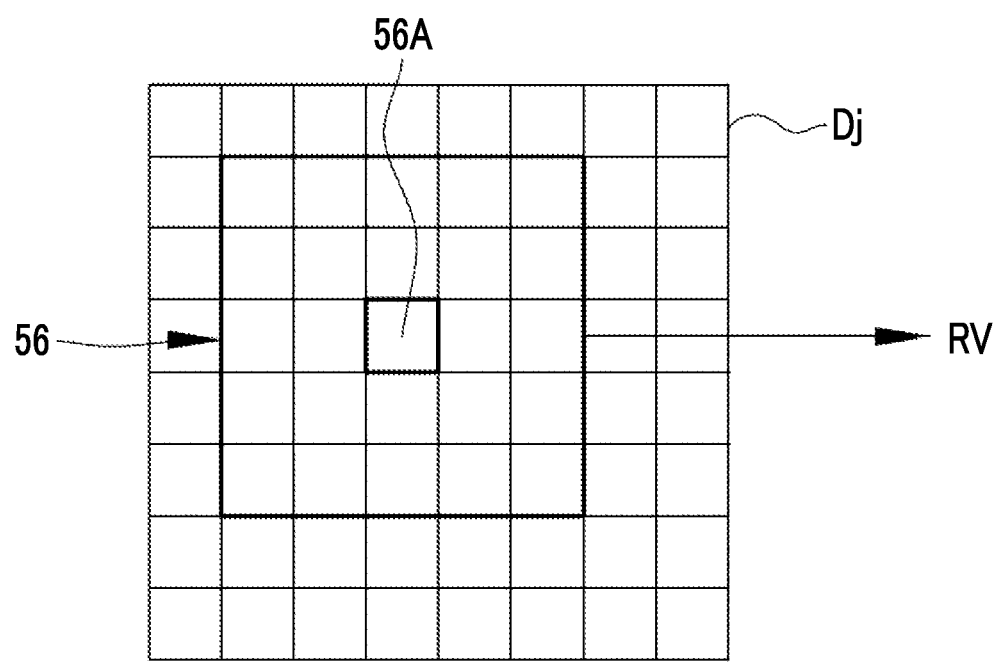
FIG. 23 is a diagram illustrating a region of interest according to a third embodiment.

FIG. 23 illustrates the region of interest 56 set in the tomographic image Dj as an example of a portion of the tomographic image Dj. The region of interest 56 is a region that has a pixel of interest 56A, which is one pixel in the tomographic image Dj, as its center and has a preset size. In the example illustrated in FIG. 23, the size of the region of interest 56 is set to a size of 5×5 pixels which has the pixel of interest 56A as its center. The region of interest 56 is a region for extracting a local feature amount in each tomographic image Dj, and the feature amount of each region of interest 56 is extracted, for example, by a filtering process of applying a filter having the same size as the region of interest 56. In this example, the size of the region of interest 56 is an example and may be other sizes.

The region selection unit 32 sets the region of interest 56 for each pixel in the tomographic images Dj while shifting the pixel of interest 56A one by one in one tomographic image Dj. Then, a representative value RV indicating the feature amount for each set region of interest 56 is derived. The region selection unit 32 performs a process of deriving the representative value RV for all of the tomographic images Dj included in the tomographic image group SD. Therefore, the representative value RV indicating the local feature amount is derived for each region of interest 56 in the entire region of each of the tomographic images Dj. The representative value RV is, for example, a variance value of the pixel values of the pixels included in the region of interest 56.

Figure 24:
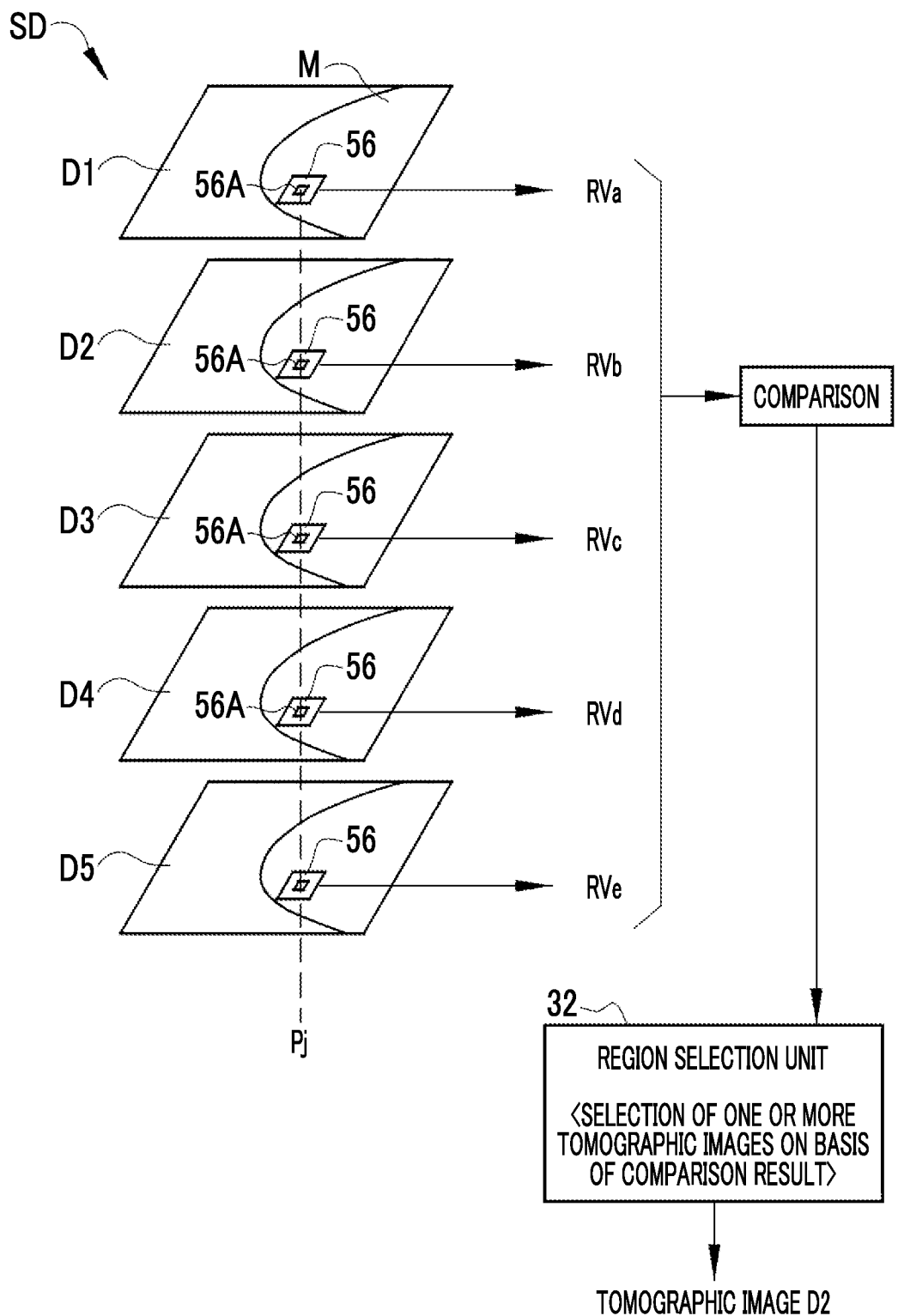
FIG. 24 is a diagram illustrating a method for selecting a tomographic image in which a target region is selected in the third embodiment.

Then, as illustrated in FIG. 24, the region selection unit 32 compares the representative values RV for each of the regions of interest 56 having one corresponding coordinate position Pj between a plurality of tomographic images Dj and selects one or more tomographic images Dj on the basis of the comparison result of the representative values RV. In the example illustrated in FIG. 24, representative values RVa, RVb, RVc, RVd, RVe, . . . of the regions of interest 56 in which the pixel of interest 56A is located at the coordinate position Pj are derived in a plurality of tomographic images D1, D2, D3, D4, D5 . . . , respectively. The region selection unit 32 compares the representative values RVa, RVb, RVc, RVd, RVe, . . . and selects one tomographic image D2 as the tomographic image Dj having the maximum variance value, which is the representative value RV according to this example, in this example. The region selection unit 32 performs a process of selecting the tomographic image Dj based on the representative value RV for each coordinate position Pj in the tomographic planes Tj.

Figure 25:
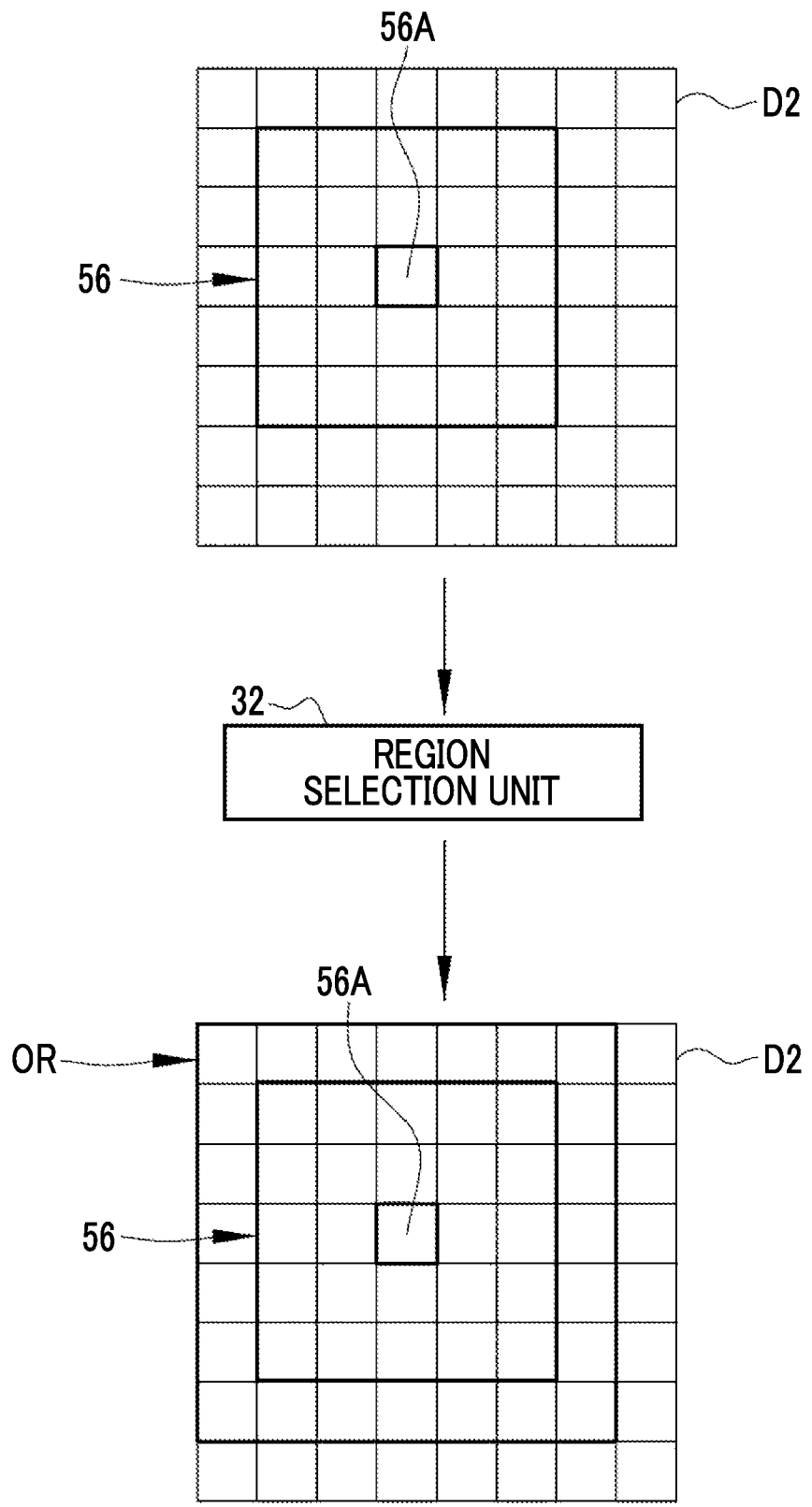
FIG. 25 is a diagram illustrating a method for selecting the target region according to the third embodiment.

As illustrated in FIG. 25, the region selection unit 32 selects the target region OR having the pixel of interest 56A as its center in the tomographic image D2 selected on the basis of the representative value RV. In the example illustrated in FIG. 25, while the region of interest 56 has a size of 5×5 pixels, the size of the target region OR is set to a size of 7×7 pixels which is larger than that of the region of interest 56. In addition, the target region OR may have the same size as the region of interest 56. However, since the target region OR is a region whose resolution is to be increased, the target region OR needs to have a sufficient size for resolution enhancement. Since the tomographic image Dj is selected for each coordinate position Pj, the region selection unit 32 selects the target region OR for each of the coordinate positions Pj.

In this example, the reason why the variance value is used as the representative value RV of the region of interest 56 is that, as the variance value is larger, a change in the density of the region of interest 56 is larger and there is a high probability that a structure, such as the structure of interest 40, will be drawn in the region of interest 56. Then, the tomographic image Dj in which the variance value of the region of interest 56 is large is selected for each of the coordinate positions Pj, which makes it possible to select the region, in which the structure of interest 40 or the like is drawn, as the target region OR. On the other hand, the undetected tomographic image Dj in which the structure of interest 40 is not detected can be excluded from the object from which the target region OR is to be selected.

Figure 26:
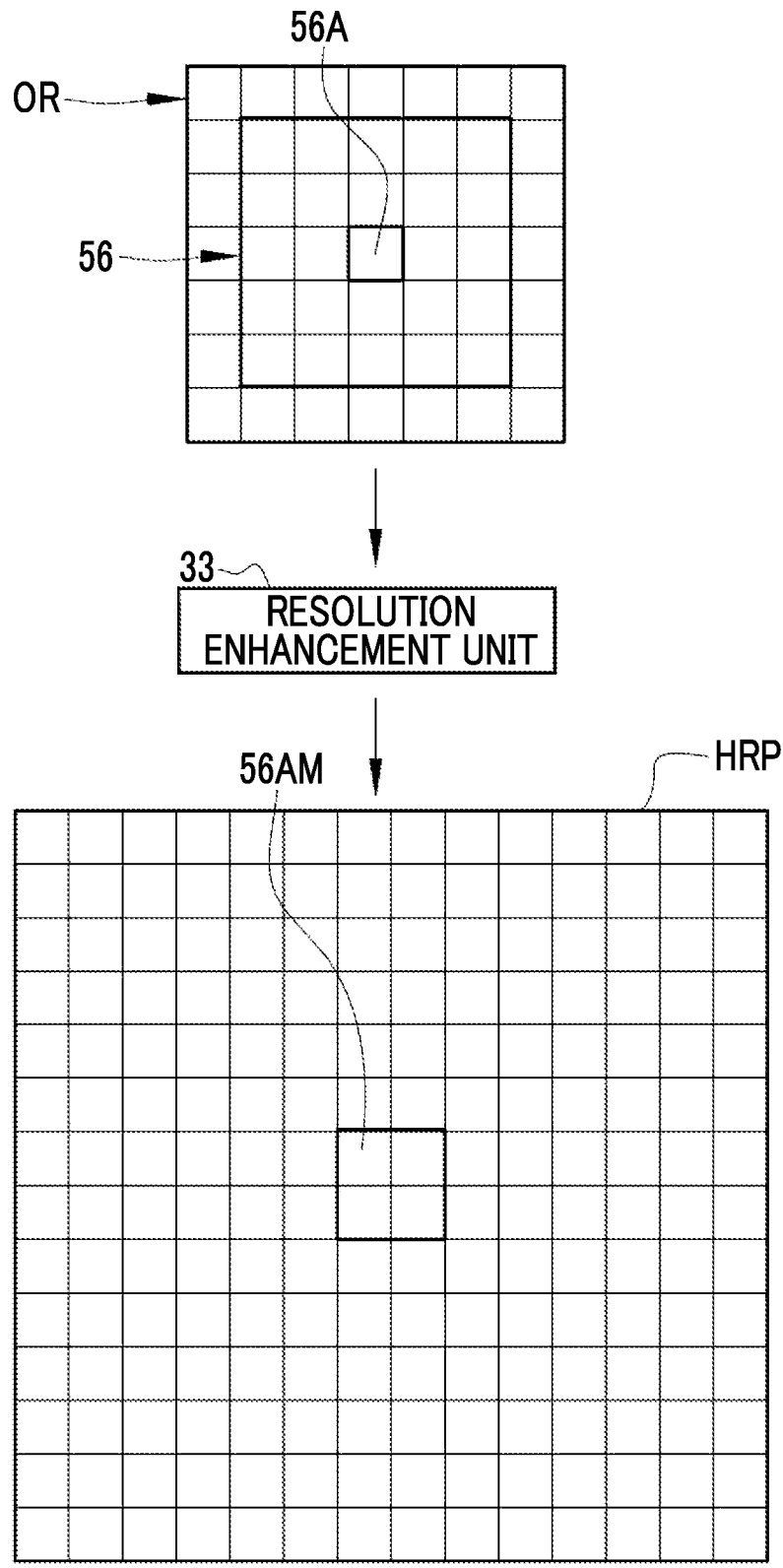
FIG. 26 is a diagram illustrating a resolution enhancement process according to the third embodiment.

Then, as illustrated in FIG. 26, the resolution enhancement unit 33 increases the resolution of the selected target region OR to the second resolution, using the super-resolution method or the like, to generate the high-resolution partial image HRP. In the example illustrated in FIG. 26, the high-resolution partial image HRP having a size of 14×14 pixels is generated from the target region OR having a size of 7×7 pixels. With the increase in resolution, the pixel of interest 56A in the target region OR becomes a region having a size of four pixels in the high-resolution partial image HRP. Here, this region is referred to as an enlarged pixel of interest 56AM.

Figure 27:
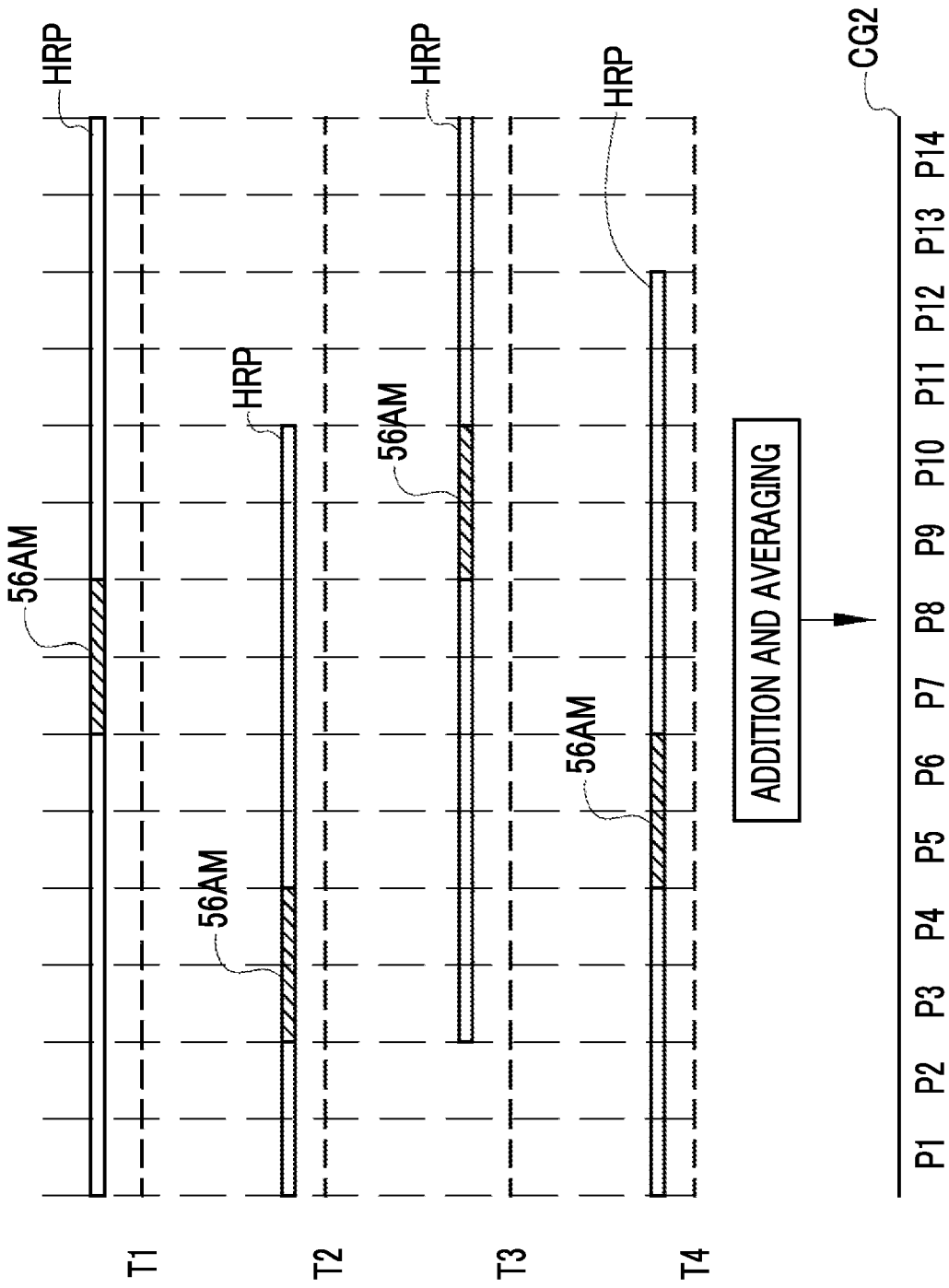
FIG. 27 is a diagram illustrating a method for generating a high-resolution composite two-dimensional image according to the third embodiment.

As illustrated in FIG. 27, the second combination unit 34 generates the high-resolution composite two-dimensional image CG2 using a plurality of generated high-resolution partial images HRP. In this example, since the number of tomographic images Dj selected on the basis of the representative value RV of the region of interest 56 is one, one high-resolution partial image HRP is present for each enlarged pixel of interest 56AM. As in the first embodiment and the second embodiment, the second combination unit 34 combines a plurality of pixels at the corresponding coordinate position Pj in a portion, in which a plurality of high-resolution partial images HRP having different depths overlap each other in the depth direction of the tomographic planes Tj, to derive the pixel value PVCG2 of the high-resolution composite two-dimensional image CG2. The combination of each pixel is performed by, for example, addition and averaging.

Figure 28:
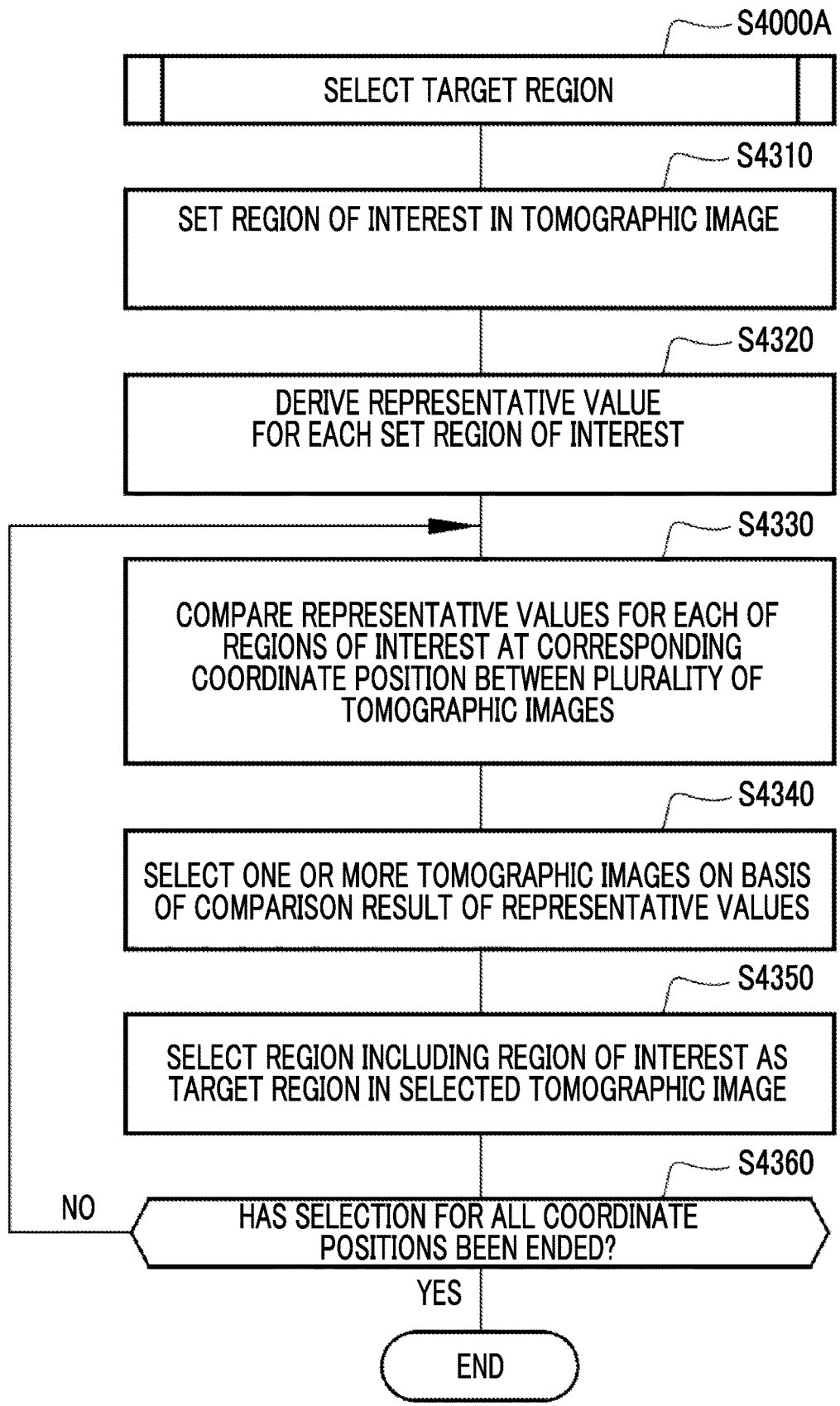
FIG. 28 is a sub-flowchart illustrating a region selection process according to the third embodiment.

The process according to the third embodiment is summarized as illustrated in a flowchart of in FIG. 28. In the third embodiment, the main flow is substantially the same as that in FIG. 18. In the third embodiment, a region selection process of selecting the target region OR is Step S4000A illustrated in FIG. 28, instead of Step S4000 illustrated in FIG. 19. Hereinafter, the difference will be mainly described.

In FIG. 28, the region selection unit 32 sets the region of interest 56 in each of a plurality of tomographic images Dj (Step S4310). Then, the region selection unit 32 derives the representative value RV indicating the feature amount of each region of interest 56 set in each of the plurality of tomographic images Dj (Step S4320). Then, in Step S4330, as illustrated in FIG. 24, the region selection unit 32 compares the representative values RV of the regions of interest 56 at the corresponding coordinate position Pj between the plurality of tomographic images Dj. Then, in Step S4340, the region selection unit 32 selects one or more tomographic images Dj (one tomographic image in this example) on the basis of the comparison result of the representative values RV. Then, in Step S4350, as illustrated in FIG. 25, the region selection unit 32 selects a region including the region of interest 56 as the target region OR in the selected tomographic image Dj. The selection of the target region OR is repeated for all of the coordinate positions Pj (Step S4360).

After the selection of the target region OR ends, the resolution enhancement unit 33 performs the same process as that in Step S5000 of FIG. 18. In this example, the high-resolution partial image HRP corresponding to the target region OR illustrated in FIG. 26 is generated. The second combination unit 34 performs the same process as that in Step S6000A of FIG. 21 in the second embodiment. As illustrated in FIG. 27, the second combination unit 34 uses only the plurality of generated high-resolution partial images HRP and combines them to generate the high-resolution composite two-dimensional image CG2.

As described above, in the third embodiment, the region of interest 56 is set in the tomographic images Dj, the representative value RV indicating the feature amount of the region of interest 56 is derived, and the tomographic image Dj in which the target region OR is to be selected is selected on the basis of the derived representative value RV. Since the process of deriving the representative value RV of the region of interest 56 can be performed by a simple filtering process, it is possible to easily perform the process of selecting the target region OR, as compared to a method for detecting the structure of interest 40 using CAD.

Further, in this example, since the region of interest 56 is set for each pixel in the tomographic image Dj, it is possible to derive the representative value RV indicating the feature amount over the entire region of the tomographic image Dj. Therefore, the feature amount in the tomographic image Dj can be used for selecting the target region OR without omission.

In addition, since the variance value of the region of interest 56 is used as the representative value RV, it is easy to select the region, in which the structure of interest 40 is drawn, as the target region OR as described above. In addition, instead of the variance value, an average value may be used as the representative value RV. Furthermore, for example, a minimum value, a maximum value, and an intermediate value may be used as the representative value RV.

[Modification Example of Selecting Plurality of Tomographic Images Based on Representative Value]

In the above-described example, one tomographic image Dj is selected on the basis of the representative value RV such that one tomographic image Dj having the largest variance value is selected for each region of interest 56. However, one tomographic image may not be selected, but a plurality of tomographic images Dj may be selected. That is, in the region selection process, the region selection unit 32 may select a predetermined number of tomographic images Dj on the basis of the ranking of the representative values RV and may select the target region OR for each of the selected tomographic images Dj. For example, the region selection unit 32 selects top two tomographic images Dj having the largest representative value RV. In this case, two tomographic images Dj are selected for each region of interest 56 corresponding to one coordinate position Pj.

Figure 29:
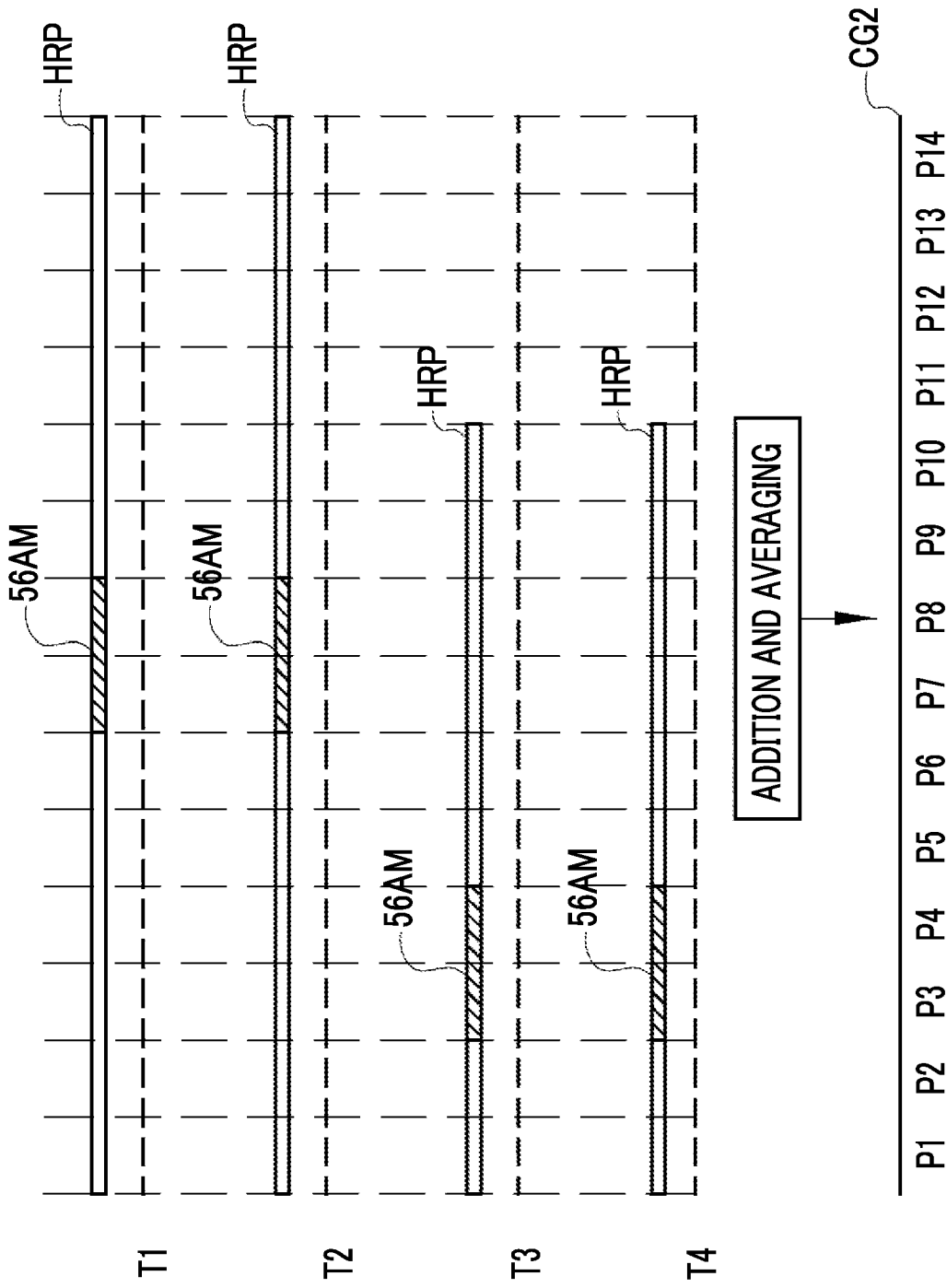
FIG. 29 is a diagram illustrating a modification example of the method for generating the high-resolution composite two-dimensional image according to the third embodiment.

In the example illustrated in FIG. 29, two tomographic images Dj are selected for each region of interest 56 corresponding to one coordinate position Pj. FIG. 29 illustrates a state after the high-resolution partial image HRP is generated for the target region OR. Therefore, the pixel of interest 56A, which is the center of the region of interest 56, becomes the enlarged pixel of interest 56AM. Further, in FIG. 29, for example, for the enlarged pixel of interest 56AM at the coordinate positions P7 and P8, two tomographic images Dj in the tomographic plane T1 and the tomographic plane T2 are selected, and the target region OR (represented by the high-resolution partial image HRP in FIG. 29) is selected for each of the selected tomographic images Dj. Furthermore, for the enlarged pixel of interest 56AM at the coordinate positions P3 and P4, the tomographic images Dj in the tomographic plane T3 and the tomographic plane T4 are selected, and the target region OR is selected for each of the selected tomographic images Dj.

As described above, a predetermined number of tomographic images Dj may be selected on the basis of the ranking of the representative values RV, and the target region OR may be selected for each of the selected tomographic images Dj. In a case in which the predetermined number is 2 or more, a plurality of tomographic images Dj are selected. This configuration makes it easy to extract the features of the structure of interest 40 extending in the depth direction of the tomographic planes Tj, as compared to a case in which one tomographic image Dj is selected for each region of interest 56.

[Modification Example of Weighted Addition]

Further, in the above-described example, as illustrated in FIG. 27, the second combination unit 34 simply adds and averages a plurality of high-resolution partial images HRP. However, as in a modification example illustrated in FIGS. 30 to 32, each pixel of the high-resolution partial images HRP may be weighted, and then weighted addition and averaging may be performed.

Figure 30:
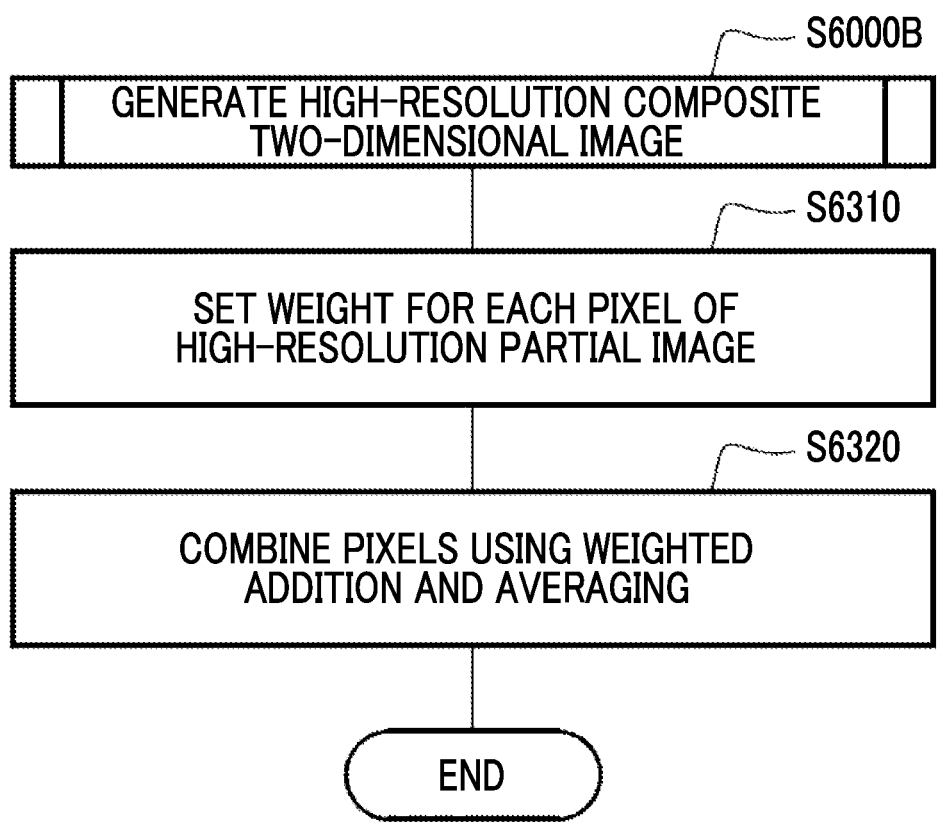
FIG. 30 is a sub-flowchart illustrating the process illustrated in FIG. 29.

In this modification example, the second combination unit 34 performs a composite two-dimensional image generation process in Step S6000B illustrated in FIG. 30, instead of Step S6000 illustrated in FIG. 20, to generate the high-resolution composite two-dimensional image CG2.

In FIG. 30, the second combination unit 34 sets a weight for each pixel of the high-resolution partial images HRP in Step S6310. For example, a coefficient indicating the weight is set as the weight as illustrated in FIG. 31. As illustrated in FIG. 31, the second combination unit 34 sets a weight, which decreases from the enlarged pixel of interest 56AM that is a central pixel corresponding to the pixel of interest 56A in the region of interest 56 toward the peripheral pixels, for each pixel in the high-resolution partial image HRP.

The weight illustrated in FIG. 31 is an example of a "first weight" according to the technology of the present disclosure. In the example illustrated in FIG. 31, the coefficient of the weight for the enlarged pixel of interest 56AM at the center has a maximum value of "1.00", and the value decreases toward the periphery. The coefficients of the weights for the pixels at four corners have a minimum value of "0.05". In a state in which the weights are set, the second combination unit 34 combines the pixels of a plurality of high-resolution partial images HRP, using the weighted addition and averaging in Step S6320 of FIG. 30.

Figure 32:
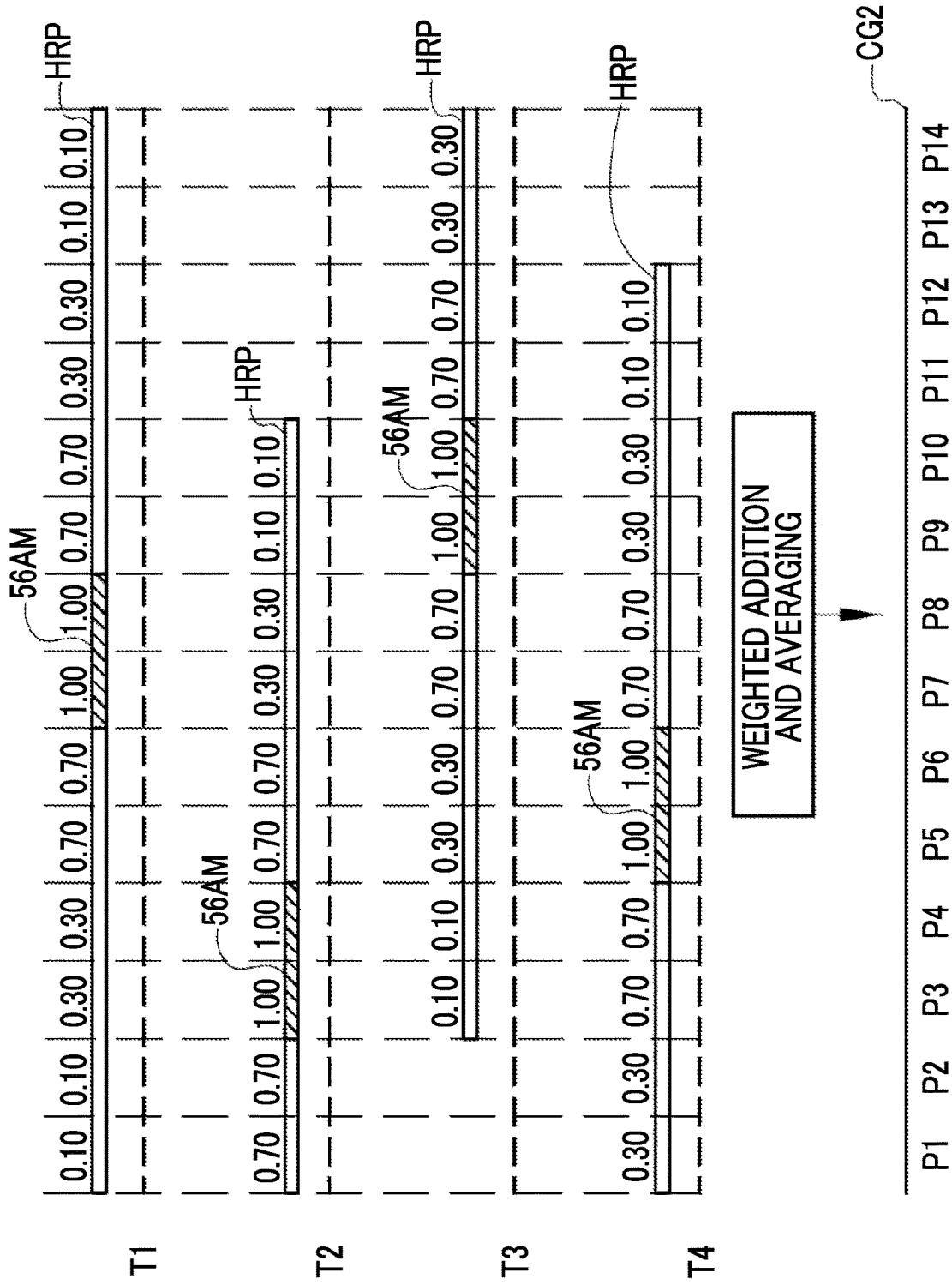
FIG. 32 is a diagram illustrating weighted addition for a plurality of high-resolution partial images.

As illustrated in FIG. 32, in the weighted addition and averaging, values obtained by multiplying the pixel values of each pixel by the coefficients of the weights set for each pixel are calculated, and the calculated values are added and averaged for a plurality of pixels corresponding to the coordinate position Pj. For example, at the coordinate position P8, the coefficient of the weight for the pixel corresponding to the tomographic plane T1 is "1.00", the coefficient of the weight for the pixel corresponding to the tomographic plane T2 is "0.30", the coefficient of the weight for the pixel corresponds to the tomographic plane T3 is "0.70", and the coefficient of the weight for the pixel corresponding to the tomographic plane T4 is "0.70". At the coordinate position P8, values obtained by multiplying the pixel values of these pixels by the coefficients of each weight are added and averaged. For example, assuming that the pixel values of the pixels in the tomographic planes T1 to T4 at the coordinate position P8 are PVT1 to PVT4, respectively, the pixel value PVCG2 of the high-resolution composite two-dimensional image CG2 at the coordinate position P8 is calculated by the following expression: $PVCG2 = \frac{1}{4} \times (1.00 \times PVT1 + 0.30 \times PVT2 + 0.70 \times PVT3 + 0.70 \times PVT4)$.

As illustrated in FIG. 32, the weight for the enlarged pixel of interest 56AM corresponding to the pixel of interest 56A has the largest value and decreases from the enlarged pixel of interest 56AM as the center toward the periphery. Each high-resolution partial image HRP is selected on the basis of the representative value RV of the region of interest 56. Therefore, in the overlap portion in which a plurality of high-resolution composite two-dimensional images CG2 having different depths overlap each other, the features of a portion close to the region of interest 56 are larger than the features of the periphery and are preferably reflected in the high-resolution composite two-dimensional image CG2. For example, at the coordinate position P8, the tomographic plane T1 corresponds to the enlarged pixel of interest 56AM corresponding to the region of interest 56, and the tomographic planes T2 to T4 other than the tomographic plane T1 do not correspond to the enlarged pixel of interest 56AM, but correspond to the peripheral pixels. Therefore, it is preferable that the pixel value of the enlarged pixel of interest 56AM in the tomographic plane T1 is more reflected in the pixel value PVCG2 of the high-resolution composite two-dimensional image CG2 at the coordinate position P8. The performance of the weighted addition as in this example makes it possible to reflect the features of a portion close to the region of interest 56 in the high-resolution composite two-dimensional image CG2 more than the features of the periphery.

Figure 33:
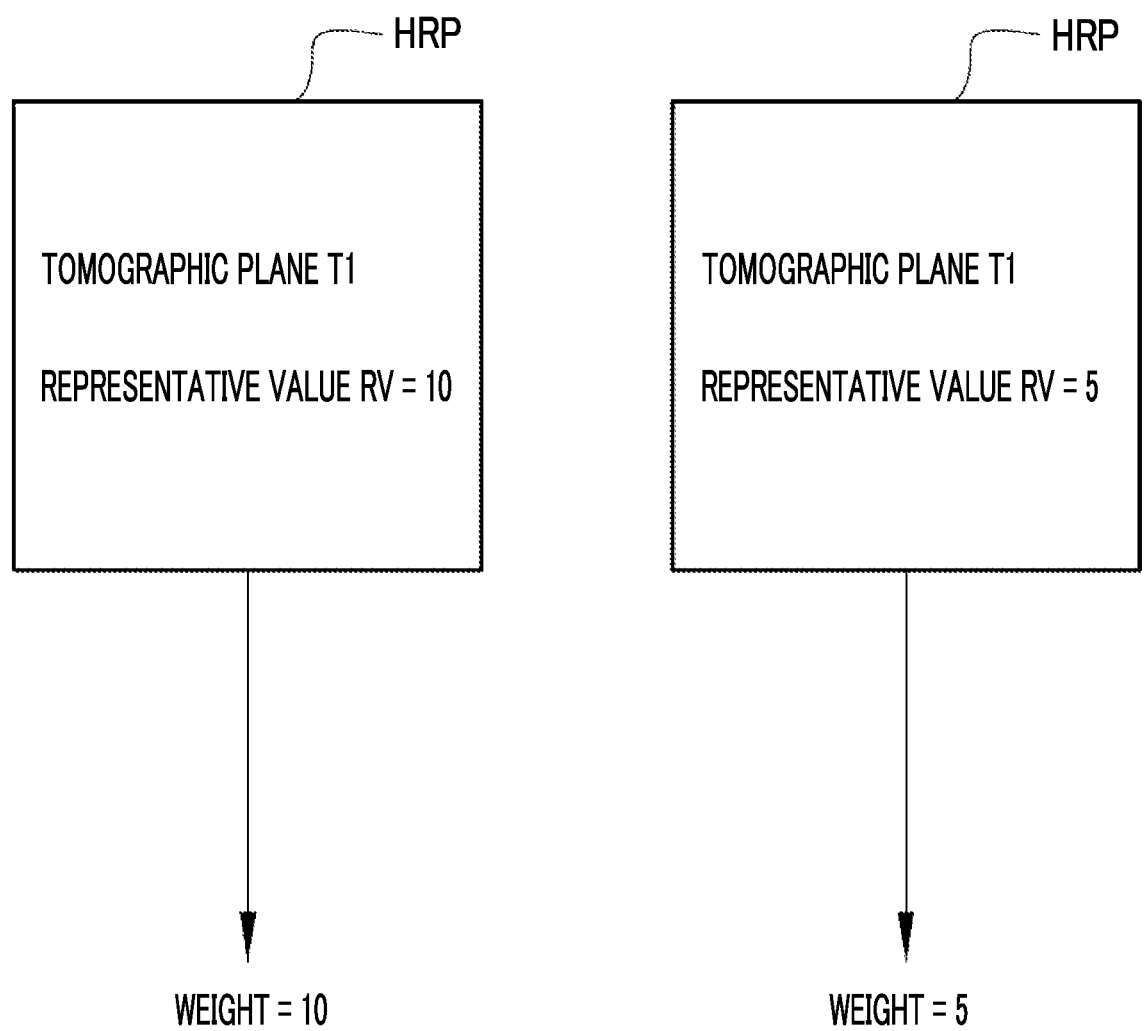
FIG. 33 is a diagram illustrating a second weight.

In addition, instead of or in addition to the weight illustrated in FIG. 31, a weight illustrated in FIG. 33 may be set. The weight illustrated in FIG. 33 is a weight corresponding to the representative value RV indicating the feature amount of each region of interest 56 and is an example of a "second weight" according to the technology of the present disclosure. The high-resolution partial image HRP is generated for each target region OR selected on the basis of the representative value RV of the region of interest 56. The weight illustrated in FIG. 33 is set according to the magnitude of the representative value RV. For example, in a case in which a variance value is used as the representative value RV, the weight is larger as the variance value is larger. The weight illustrated in FIG. 33 is not set for each pixel, but only one weight is set for the high-resolution partial image HRP unlike the weight illustrated in FIG. 31. In the example illustrated in FIG. 33, the weight is set to "10" for a representative value RV of "10" and is set to "5" for a representative value RV of "5". The second combination unit 34 weights each pixel of the high-resolution partial images HRP and performs addition and averaging to generate the high-resolution composite two-dimensional image CG2.

The setting of the second weight as illustrated in FIG. 33 makes it possible to reflect a larger number of features of the high-resolution partial image HRP having a large representative value RV in the high-resolution composite two-dimensional image CG2. In addition, either the first weight illustrated in FIG. 31 or the second weight illustrated in FIG. 33 may be used, or both the first weight and the second weight may be used.

[Modification Example of Thinning-Out of Pixel of Interest]

Figure 34:
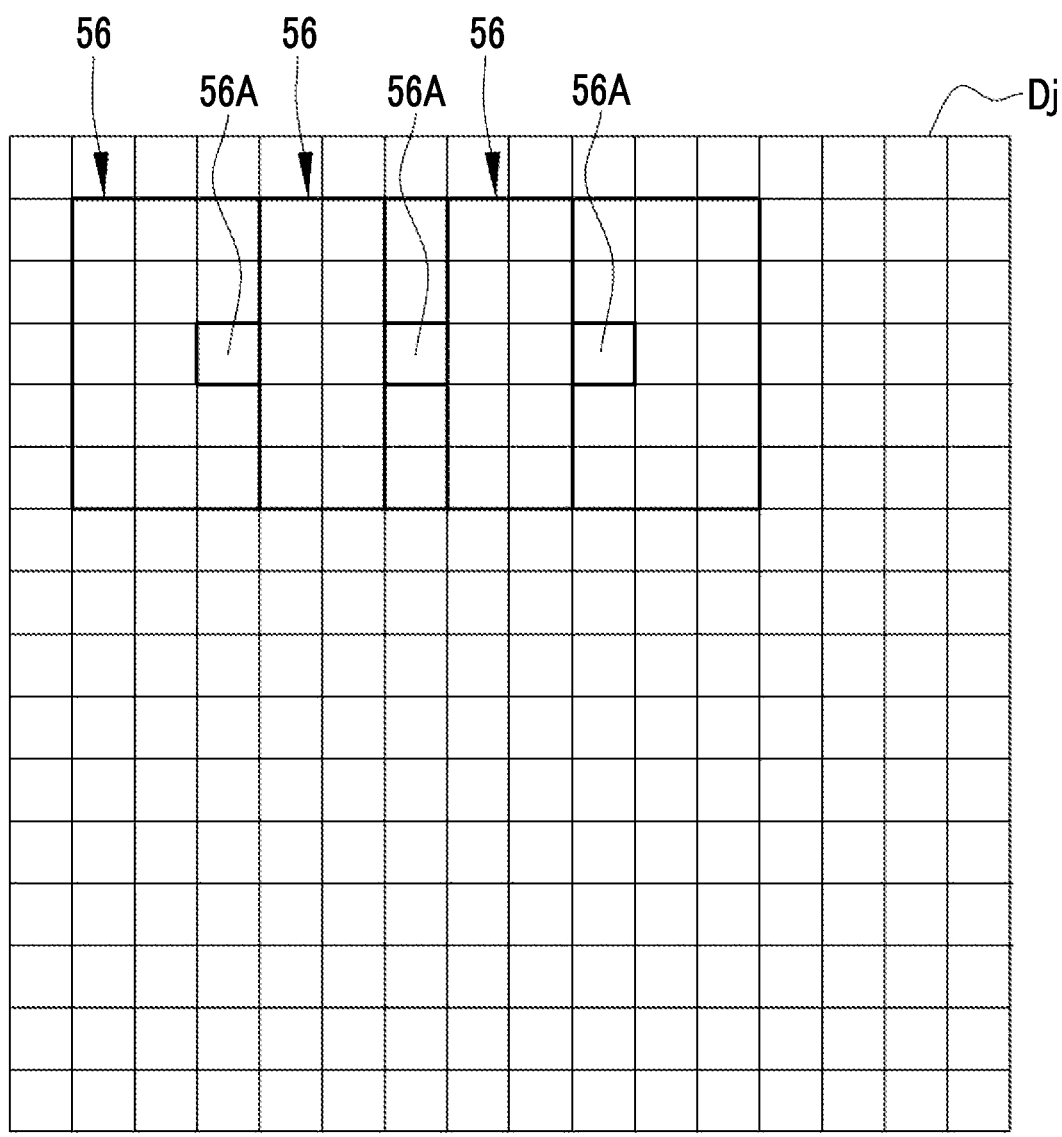
FIG. 34 is a diagram illustrating an example of a case in which the regions of interest are set with an interval between the pixels of interest.
Figure 35:
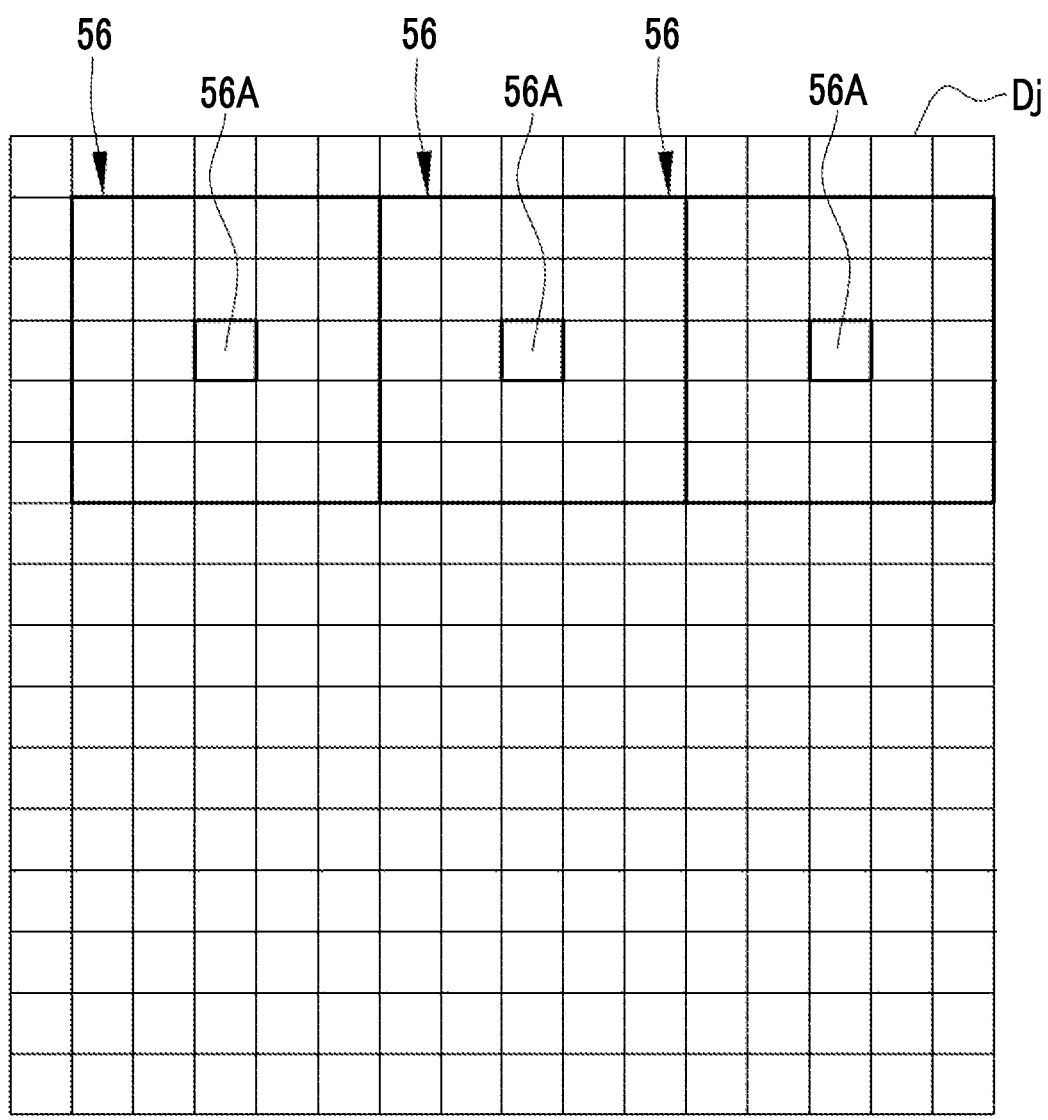
FIG. 35 is a diagram illustrating an example different from that of FIG. 34.
Figure 36:
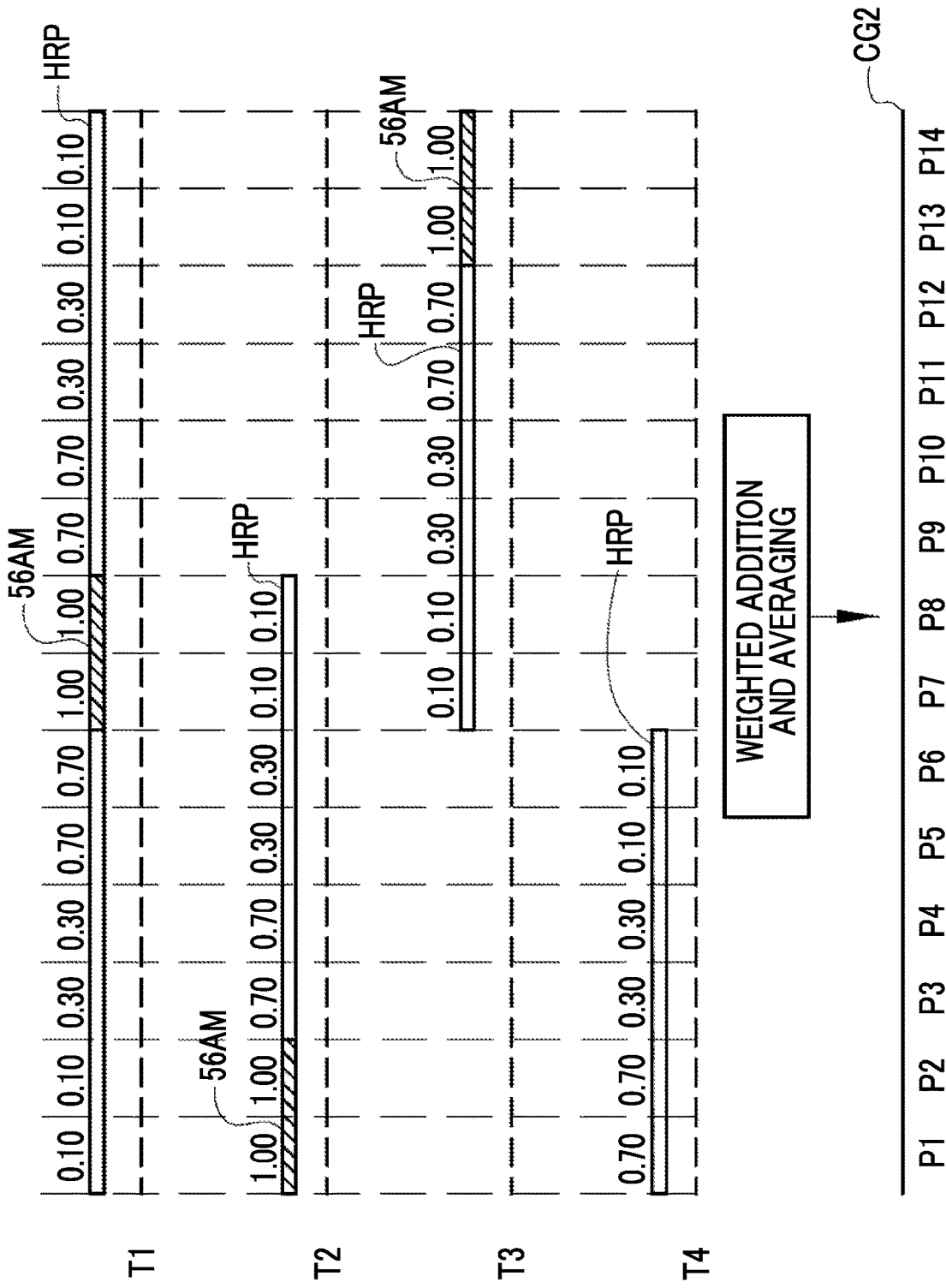
FIG. 36 is a diagram in a case in which weighted addition is performed in the example illustrated in FIG. 34.

In the above-described example, the region of interest 56 is set for each pixel of the tomographic images Dj. However, as illustrated in FIGS. 34 to 36, the region selection unit 32 may set regions of interest 56 having a size of m×m pixels with an interval of n or more pixels between the pixels of interest 56A in the region selection process. Here, it is assumed that n is a natural number equal to or greater than 1, m is a natural number equal to or greater than 3, and the condition of m>n is satisfied.

The example illustrated in FIG. 34 is an example in which, in the tomographic image Dj, the regions of interest 56 having a size of 5×5 pixels are set with an interval of two pixels between the pixels of interest 56A. In the example illustrated in FIG. 34, n is 2, m is 5, 5>2 is established, and the condition of m>n is satisfied. The example illustrated in FIG. 35 is an example in which, in the tomographic image Dj, the regions of interest 56 having a size of 5×5 pixels are set with an interval of four pixels between the pixels of interest 56A. In the example illustrated in FIG. 35, n is 4, m is 5, 5>4 is established, and the condition of m>n is satisfied.

The selection of the target region OR and the generation of the high-resolution partial image HRP are performed on the basis of the set regions of interest 56. In this example, a composite two-dimensional image generation process of generating the high-resolution composite two-dimensional image CG2 using the high-resolution partial images HRP is performed as illustrated in FIG. 36.

The example illustrated in FIG. 36 is an example of a case in which the pixels of interest 56A are set at an interval of two pixels as illustrated in FIG. 34. In this case, the high-resolution partial image HRP is not generated for each enlarged pixel of interest 56AM corresponding to the pixel of interest 56A, but is generated at intervals of the pixels. However, since the regions of interest 56 are set to satisfy the condition of m>n, any high-resolution partial image HRP is present at all of the coordinate positions Pj. That is, in the high-resolution composite two-dimensional image CG2, an interval portion between the pixels in which the high-resolution partial image HRP is not present does not occur. In addition, the region of interest 56 is set so as to satisfy the condition of m>n. Therefore, as illustrated in FIG. 35, even in a case in which there is a pixel interval between the pixels of interest 56A, no gap occurs between adjacent regions of interest 56. Therefore, since all of the pixels in the tomographic image Dj are included in any of the regions of interest 56, the features of all of the pixels of the tomographic image Dj can be reflected in the selection of the target region OR.

In a case in which the regions of interest 56 are set with an interval between the pixels of interest 56A as in this example, the number of target regions OR is reduced. Therefore, it is possible to generate the high-resolution composite two-dimensional image CG2 with high resolution while reducing the amount of processing required to generate the high-resolution partial image HRP.

[Modification Example of Changing Method for Setting Region of Interest in Region Including Object and Other Regions]

Figure 37:
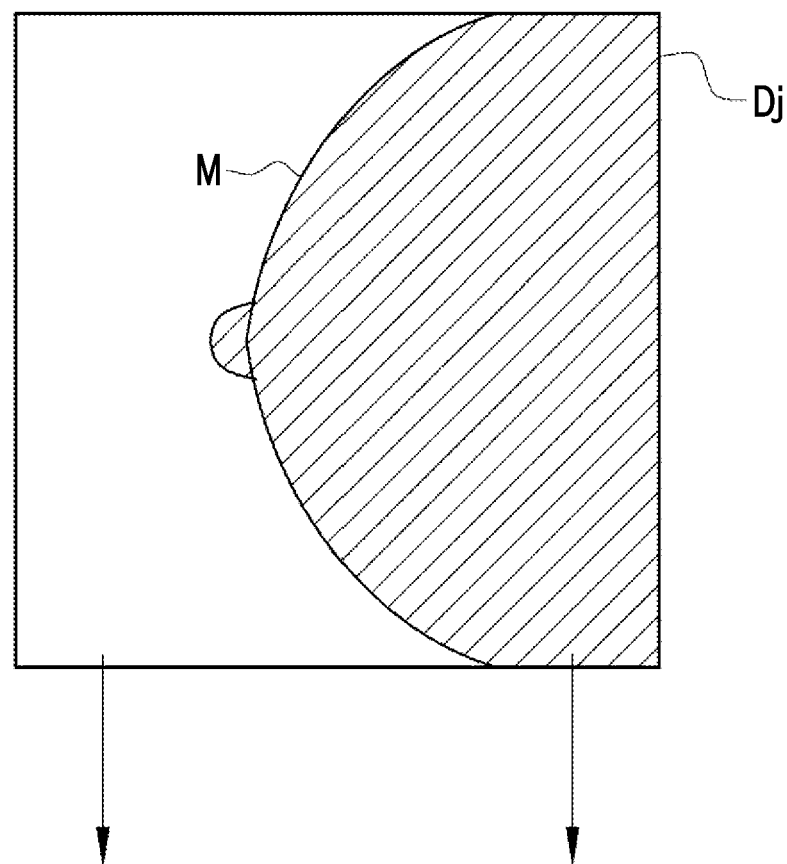
FIG. 37 illustrates an example in which a method for setting the region of interest is changed between a region in which an object is present and other regions.

In addition, as illustrated in FIG. 37, in the tomographic image Dj, for example, the region of interest 56 may be set in a region (indicated by hatching) in which the breast M, which is an example of the object, is present. The region of interest 56 may not be set in other regions such as a blank region. In a case in which the region of interest 56 is set at least in the region in which the object is present, it is possible to increase the definition of a minimum necessary region. As the region in which the region of interest 56 is set is reduced, a load on data processing is also reduced.

Further, in the tomographic image Dj, the region of interest 56 may be set for each pixel in the region in which the breast M is present, and the regions of interest 56 may be set with an interval between the pixels of interest 56A in other regions such as the blank region. In this case, in the region in which the breast M requiring relatively high-definition image quality is present, processing is performed for each pixel, and a portion of processing for other regions, such as the blank region, is omitted while high image quality is maintained, which makes it possible to shorten the processing time.

Further, in each of the above-described embodiments, the target region OR is a rectangular region. However, the present disclosure is not limited thereto. The target region OR may have a shape, such as a circular shape, other than the rectangular shape. In addition, in a case in which the structure of interest 40 is detected, the shape of the target region OR may be matched with the outer shape of the detected structure of interest 40.

In each of the above-described embodiments, the tomographic images Dj obtained by the tomosynthesis imaging are given as an example. However, the present disclosure is not limited thereto. For example, tomographic images obtained by computed tomography (CT), positron emission tomography (PET), single photon emission computed tomography (SPECT), or magnetic resonance imaging (MRI) may be used.

In each of the above-described embodiments, for example, the following various processors can be used as the hardware structure of processing units performing various processes, such as the image acquisition unit 30, the first combination unit 31, the region selection unit 32, the resolution enhancement unit 33, the second combination unit 34, and the display control unit 35. The various processors include, for example, the CPU 21 which is a general-purpose processor executing software (image processing program 22) to function as various processing units as described above, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process.

One processing unit may be configured by one of the various processors or a combination of two or more processors of the same type or different types (for example, a combination of a plurality of FPGAs and/or a combination of a CPU and an FPGA). In addition, a plurality of processing units may be configured by one processor.

A first example of the configuration in which a plurality of processing units are configured by one processor is an aspect in which one processor is configured by a combination of one or more CPUs and software and functions as a plurality of processing units as in a case in which the image processing device 4 is configured by a plurality of computers. A second example of the configuration is an aspect in which a processor that implements the functions of the entire system including a plurality of processing units using one integrated circuit (IC) chip is used. A representative example of this aspect is a system-on-chip (SoC). As such, various processing units are configured by using one or more of the various processors as a hardware structure.

Furthermore, specifically, an electric circuit (circuitry) obtained by combining circuit elements, such as semiconductor elements, can be used as the hardware structure of the various processors.

In addition, the various processors perform various processes in cooperation with a memory that is provided in or connected to the processors.

The technology of the present disclosure may be appropriately combined with the above-described various embodiments and various modification examples. In addition, the present disclosure is not limited to each of the above-described embodiments, and various configurations can be used without departing from the gist of the present disclosure. Furthermore, the technology of the present disclosure extends to a storage medium that non-temporarily stores the program and can be read by the computer, in addition to the program.

The content described and illustrated above is a detailed description of portions related to the technology of the present disclosure and is just an example of the technology of the present disclosure. For example, the description of the configurations, functions, operations, and effects is the description of examples of the configurations, functions, operations, and effects of the portions related to the technology of the present disclosure. Therefore, unnecessary portions may be deleted or new elements may be added or replaced in the contents described and illustrated above, without departing from the scope and spirit of the technology of the present disclosure. In addition, the description of, for example, common technical knowledge that does not need to be particularly described to enable the implementation of the technology of the present disclosure is omitted in the content described and illustrated above in order to avoid confusion and to facilitate the understanding of the portions related to the technology of the present disclosure.

In the specification, "A and/or B" is synonymous with "at least one of A or B." That is, "A and/or B" means only A, only B, or a combination of A and B. Further, in the specification, the same concept as "A and/or B" is applied to a case in which the connection of three or more matters is expressed by "and/or".

All of the documents, the patent applications, and the technical standards described in the specification are incorporated by reference herein to the same extent as each individual document, each patent application, and each technical standard are specifically and individually stated to be incorporated by reference.

What is claimed is:

1. An image processing device comprising:
a processor; and
a memory that is provided in or connected to the processor,
wherein the processor executes a region selection process of selecting a portion of a plurality of tomographic images, which indicate a plurality of tomographic planes of an object, respectively, and have a first resolution, as a target region to be set to a second resolution higher than the first resolution, a resolution enhancement process of increasing the resolution of the target region to the second resolution to generate a high-resolution partial image, and a composite two-dimensional image generation process of generating a high-resolution composite two-dimensional image having the second resolution, using the high-resolution partial image, and
wherein the processor combines a plurality of tomographic images having the first resolution in a depth direction, in which the tomographic planes are arranged, to generate a low-resolution composite two-dimensional image having the first resolution, and combines an enlarged image obtained by increasing the number of pixels of the low-resolution composite two-dimensional image to the number of pixels corresponding to the second resolution with the high-resolution partial image to generate the high-resolution composite two-dimensional image in the composite two-dimensional image generation process.

2. The image processing device according to claim 1,
wherein, in the region selection process, the processor selects a region including a structure of interest in the tomographic image as the target region.

3. The image processing device according to claim 2,
wherein the object is a breast, and
the structure of interest includes at least one of a tumor, a calcification, a spicula, or a linear structure.

4. The image processing device according to claim 1,
wherein, in a case in which one pixel in the tomographic image is set as a pixel of interest and a region with a preset size which has the pixel of interest as its center is set as a region of interest, in the region selection process, the processor derives a representative value indicating a feature amount of the region of interest in each of a plurality of the tomographic images, compares the representative values for each of the regions of interest at a corresponding coordinate position between the tomographic images, selects one or more of the tomographic images on the basis of a comparison result of the representative values, and selects the target region having the pixel of interest as its center in the selected tomographic image.

5. The image processing device according to claim 4,
wherein, in the region selection process, the processor selects a predetermined number of the tomographic images on the basis of a ranking of the representative values and selects the target region in each of the selected tomographic images.

6. The image processing device according to claim 4,
wherein, in the region selection process, the processor sets the region of interest in at least a region in which the object is present in the tomographic image.

7. The image processing device according to claim 4,
wherein, in the region selection process, the processor sets the region of interest for each of the pixels.

8. The image processing device according to claim 4,
wherein, in the region selection process, the processor sets the regions of interest having a size of m×m pixels, with an interval of n or more pixels between the pixels of interest, among the pixels included in the tomographic image, where n is a natural number equal to or greater than 1, m is a natural number equal to or greater 3, and m>n is satisfied.

9. The image processing device according to claim 1,
wherein, in the composite two-dimensional image generation process, the processor increases the resolution of the low-resolution composite two-dimensional image to the second resolution to generate a temporary high-resolution composite two-dimensional image as the enlarged image, and combines the temporary high-resolution composite two-dimensional image with the high-resolution partial image to generate the high-resolution composite two-dimensional image.

10. The image processing device according to claim 9, wherein, in the region selection process, in a case in which a region including a structure of interest in the tomographic image is selected as the target region, the processor detects the structure of interest using any one of the tomographic image, the low-resolution composite two-dimensional image, or the temporary high-resolution composite two-dimensional image.

11. The image processing device according to claim 10, wherein the processor detects the structure of interest using the low-resolution composite two-dimensional image.

12. The image processing device according to claim 1, wherein, in a case in which a pixel value of the enlarged image is set as a temporary pixel value, the processor combines pixels of the enlarged image and the high-resolution partial image, using any one of a method that substitutes the temporary pixel value with a pixel value of the high-resolution partial image, a method that calculates an average value of the temporary pixel value and the pixel value of the high-resolution partial image and substitutes the average value with the temporary pixel value, or a method that adds the pixel value of the high-resolution partial image to the temporary pixel value.

13. The image processing device according to claim 4, wherein the processor generates the high-resolution partial image for each target region in the resolution enhancement process, and generates the high-resolution composite two-dimensional image using only a plurality of the high-resolution partial images in the composite two-dimensional image generation process.

14. The image processing device according to claim 13, wherein, in the composite two-dimensional image generation process, the processor combines a plurality of pixels at a corresponding coordinate position in the tomographic planes to derive a pixel value of the high-resolution composite two-dimensional image, for an overlap portion in which the plurality of high-resolution partial images having different depths of the tomographic planes overlap each other in a depth direction of the tomographic planes, and sets the pixel value of any one of the plurality of high-resolution partial images as the pixel value of the high-resolution composite two-dimensional image for a portion other than the overlap portion.

15. The image processing device according to claim 14, wherein the processor combines the plurality of corresponding pixels in the overlap portion using any one of simple addition, addition and averaging, or weighted addition and averaging for pixel values.

16. The image processing device according to claim 15, wherein, in a case in which the high-resolution partial image is generated for the target region selected on the basis of the region of interest, in the composite two-dimensional image generation process, the processor sets at least one of a first weight, which decreases from a center pixel corresponding to the pixel of interest in the region of interest toward peripheral pixels, or a second weight, which corresponds to a representative value indicating a feature amount of each region of interest, for each pixel in the high-resolution partial image, and performs the weighted addition and averaging on the basis of at least one of the first weight or the second weight.

17. The image processing device according to claim 1, wherein, in the resolution enhancement process, the processor applies a super-resolution method using the tomographic image to generate the high-resolution partial image.

18. The image processing device according to claim 1, wherein, in the resolution enhancement process, the processor applies a method, which uses a plurality of projection images used to reconstruct the tomographic images, to generate the high-resolution partial image.

19. A method for operating an image processing device, the method comprising:
a region selection process of selecting a portion of a plurality of tomographic images, which indicate a plurality of tomographic planes of an object, respectively, and have a first resolution, as a target region to be set to a second resolution higher than the first resolution;
a resolution enhancement process of increasing the resolution of the target region to the second resolution to generate a high-resolution partial image; and
a composite two-dimensional image generation process of generating a high-resolution composite two-dimensional image having the second resolution, using the high-resolution partial image,
wherein the composite two-dimensional image generation process includes:
combining a plurality of tomographic images having the first resolution in a depth direction, in which the tomographic planes are arranged, to generate a low-resolution composite two-dimensional image having the first resolution; and
combining an enlarged image obtained by increasing the number of pixels of the low-resolution composite two-dimensional image to the number of pixels corresponding to the second resolution with the high-resolution partial image to generate the high-resolution composite two-dimensional image.

20. A non-transitory computer-readable storage medium storing a program for operating an image processing device, the program causing a computer to execute:
a region selection process of selecting a portion of a plurality of tomographic images, which indicate a plurality of tomographic planes of an object, respectively, and have a first resolution, as a target region to be set to a second resolution higher than the first resolution;
a resolution enhancement process of increasing the resolution of the target region to the second resolution to generate a high-resolution partial image; and
a composite two-dimensional image generation process of generating a high-resolution composite two-dimensional image having the second resolution, using the high-resolution partial image,
wherein the composite two-dimensional image generation process includes:
combining a plurality of tomographic images having the first resolution in a depth direction, in which the tomographic planes are arranged, to generate a low-resolution composite two-dimensional image having the first resolution; and
combining an enlarged image obtained by increasing the number of pixels of the low-resolution composite two-dimensional image to the number of pixels corresponding to the second resolution with the high-resolution partial image to generate the high-resolution composite two-dimensional image.

\* \* \* \* \*